United States Patent
De Shazer

(10) Patent No.: US 6,239,926 B1
(45) Date of Patent: May 29, 2001

(54) APPARATUS FOR VISUAL ALIGNMENT DURING TRAILER HITCH-UP

(75) Inventor: Richard F. De Shazer, Port Lavaca, TX (US)

(73) Assignee: Desh Enterprises, Inc., Lavaca, TX (US)

( * ) Notice: Subject to any disclaimer, the term of this patent is extended or adjusted under 35 U.S.C. 154(b) by 0 days.

(21) Appl. No.: 09/475,100

(22) Filed: Dec. 30, 1999

(51) Int. Cl.⁷ .............................. G02B 5/10; G02B 7/182; B60R 1/00
(52) U.S. Cl. .................... 359/841; 359/850; 359/864; 359/872; 359/881; 33/264; 280/477; 248/479; 248/480; 248/485
(58) Field of Search ........................ 359/841, 850, 359/864, 865, 872, 881, 857; 248/479, 480, 484, 485, 486, 487; 33/264; 280/477

(56) References Cited

U.S. PATENT DOCUMENTS

| 552,693 | * | 1/1896 | Myers . | |
|---|---|---|---|---|
| 1,063,220 | * | 6/1913 | Seamon . | |
| 2,697,776 | * | 12/1954 | Wale . | |
| 3,295,914 | * | 1/1967 | Dietrich . | |
| 3,767,292 | * | 10/1973 | Rutkowski . | |
| 3,858,966 | | 1/1975 | Lowell | 350/307 |
| 4,163,606 | | 8/1979 | Granno | 350/307 |
| 4,363,534 | * | 12/1982 | Covert . | |
| 4,905,376 | | 3/1990 | Neeley | 33/264 |
| 4,925,287 | | 5/1990 | Lord | 350/632 |
| 5,111,342 | | 5/1992 | Quesada | 359/872 |
| 5,180,182 | | 1/1993 | Haworth | 280/477 |
| 5,235,468 | | 8/1993 | Stephens | 359/841 |
| 5,309,289 | | 5/1994 | Johnson | 359/871 |
| 5,328,199 | * | 7/1994 | Howe | 280/477 |
| 5,478,101 | * | 12/1995 | Roberson | 359/872 |
| 5,482,310 | | 1/1996 | Staggs | 280/477 |
| 5,550,681 | * | 8/1996 | Mazarac | 359/881 |
| 5,625,500 | * | 4/1997 | Ackerman | 359/841 |
| 5,657,175 | | 8/1997 | Brewington | 359/872 |
| 5,784,312 | | 7/1998 | Howard | 359/872 |
| 5,825,564 | * | 10/1998 | Mazarac | 359/872 |
| 5,971,555 | | 10/1999 | Wilcox et al. | 359/872 |
| 6,062,697 | * | 5/2000 | Bryant et al. | 248/479 |
| 6,076,847 | * | 6/2000 | Thornton | 280/477 |

FOREIGN PATENT DOCUMENTS

2601527 * 7/1977 (DE) ................................ 359/872

* cited by examiner

Primary Examiner—Ricky D. Shafer

(57) ABSTRACT

A visual observation system, using the towing vehicle's rearview mirror and a trailer mounted mirror apparatus to align the vehicle's hitch ball and the trailer's hitch receiver without having to use a second person to observe the hitch and guide the driver. The driver does not have to leave the vehicle to observe the relative position of the trailer hitch and the vehicle ball. This allows the driver to align the hitch without damaging the vehicle or the trailer. This apparatus uses a mirror assembly (60), comprising a combination of a convex mirror and a flat mirror mounted on a offset bracket attached to telescoping support (50), on a rotating base assembly (30) offset to the side of the trailer tongue, forming a unit that can be rotated into offset storage clip (75), mounted on the trailer tongue, or easily removed for storage without the use of tools. The unit gives a large field of vision while backing up the vehicle, using the convex mirror. It provides an enlarged view of the hitch components, so the driver can clearly see the components in the flat mirror, while making the final alignment. A height adjustable, self-aligning, positive positioning, telescoping support (50) allows the apparatus to be used for any towing vehicle from a small car to a large pickup truck and all known utility vehicles.

20 Claims, 17 Drawing Sheets

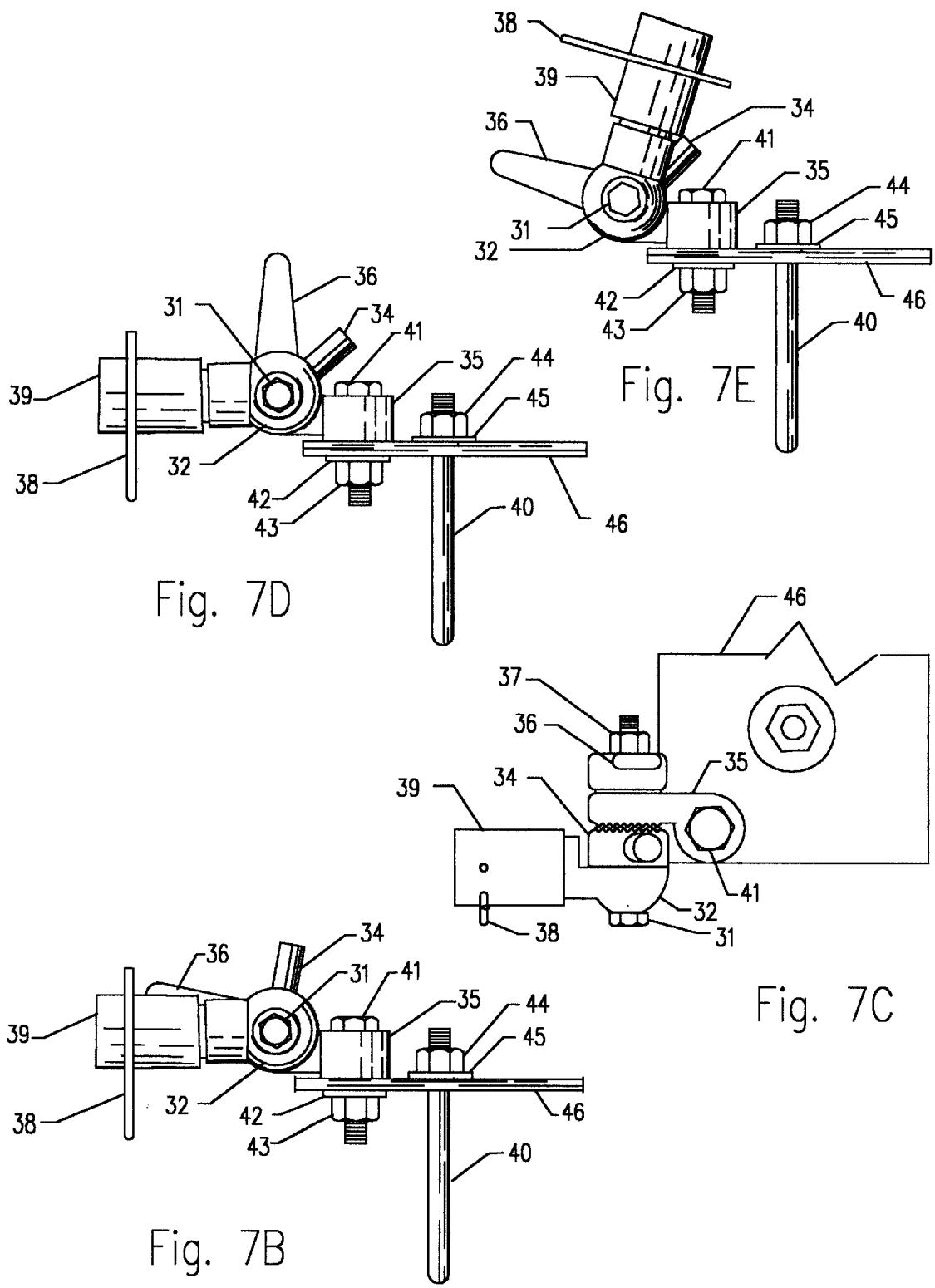

APPARATUS FOR VISUAL ALIGNMENT DURING TRAILER HITCH-UP

BACKGROUND—FIELD OF INVENTION

This invention relates to towed vehicles, specifically to a device for facilitating a trailer hitch-up process.

BACKGROUND—DESCRIPTION OF PRIOR ART

Connecting a trailer to a vehicle has been a problem since the advent of motor vehicles. This process is very difficult without another person, in addition to the vehicle driver, to direct the driver. If no one is available, then the driver must get out of the vehicle several times to observe the relative positions of the hitch components and to adjust the vehicle's position to align the hitch components.

The inability of the driver to observe the hitch components while backing the vehicle is both aggravating and dangerous. A child could be between the trailer and the vehicle and may not be observable by the driver, especially where the vehicle is a pickup truck or a large utility vehicle. Damage to the vehicle bumper and license plates are common because of backing into the trailer hitch.

A number of apparatuses have been created to assist the driver during the process of hooking up a trailer. All of these apparatuses suffer from a number of disadvantages.

U.S. Pat. No. 5,971,555 Wilcox and Musselman (1999) discloses a reflector device that fastens to the tailgate of a pickup truck using suction cups to hold the assembly in place. It will not work on an automobile. This device uses a flat mirror that severely limits the field of vision. This device is very bulky to store and must be removed from the towing vehicle between uses. It must be readjusted each time it is used.

U.S. Pat. No. 5,784,213 to Howard (1998) discloses a reflector device that mounts on a towing vehicle using hook members for hanging on a tailgate and suction cup members to attach to other towing vehicles. This device uses a convex mirror that will give a larger field of view than a flat mirror but reduces the size of the reflection of the hitches severely, making it difficult to complete the final alignment. This device must be removed and stored between uses. It must be adjusted each time it is used.

U.S. Pat. No. 5,657,175 to Brewington (1997) discloses a reflector device that will work only on a vehicle with a tailgate, such as a pickup truck or a station wagon; it will not work on an automobile. This device uses a flat mirror that severely limits the field of vision. The patent states that the mirror of the reflector could have special optical properties, for example, a convex reflective surface ( or a convex portion ), giving a wider field of view than a flat-plain mirror. This device us very bulky to store to be readily available for future use.

U.S. Pat. No. 5,482,310 to Staggs (1996) discloses a device that fastens to the tailgate of a pickup truck with a magnet coupled to mounting bracket. The device uses a flat mirror that presents a very small field of vision. There is no positive lock to prevent the support arms from rotating on the mounting base. This allows the mirror to get out of alignment easily. It is necessary to have magnets strong enough to hold without slipping and still weak enough that they can be removed from the tailgate without damage to the paint. This device is bulky to store and is not readily available for future use.

U.S. Pat. No. 5,235,468 to Stephens (1993) discloses a device mounted on a trailer. It requires that the trailer have a vertical bulkhead behind the trailer hitch receiver for attachment of the mirror anchor bracket. This device will not work on any trailer without a vertical surface to attach the bracket. This device uses a flat mirror that a relatively small field of vision during hookup.

U.S. Pat. No. 5,180,182 to Haworth (1993) discloses a device that uses a convex mirror. This mirror will give a large field of view during the approach of the towing vehicle. The convex mirror reduces the size of the reflection of the hitch components, making it difficult to distinguish between the vehicle ball hitch and the trailer receiving hitch. This makes it very difficult to complete the final alignment. This device can be used only on pickup trucks or other vehicles with a tailgate. This device is bulky and difficult to store when not in use.

U.S. Pat. No. to 5,309,289 to Johnson (1994) discloses a device using a convex mirror and a complicated viewing arrangement fastened to the trailer. This device is difficult to set up and use. The convex mirror reduces the size of the reflection of the hitch components, making it difficult to distinguish between the vehicle ball hitch and the trailer receiving hitch. This makes it very difficult to complete the final alignment.

U.S. Pat. No. 5,111,342 to Quesada (1992) discloses a device using suction cups to attach the mirror assembly to the towing vehicle. The device uses only a flat mirror to view the hitches. This severely limits the field of vision, making it necessary to be very close to alignment before the trailer hitch can be observed. This device requires alignment before each use and is bulky to store. This device will not work on automobiles with trunks.

U.S. Pat. No. 4,925,287 to Lord (1990) discloses a device using multiple legs and a convex mirror with suction cups attached to the legs for mounting. The convex mirror makes alignment very difficult. It would be necessary to realign each time it is used, and it is bulky to store. The device must be attached to the towing vehicle and is difficult to attach to all shapes and sizes of towing vehicles.

U.S. Pat. No. 4,905,376 to Neeley (1990) discloses a device that uses two types of mounting devices, a clamping device for pickup trucks and a magnetic device for passenger cars. This device is bulky to store and must be realigned every time it is used. It also uses one flat mirror for the viewing device.

U.S. Pat. No. 4,163,606 to Granno (1979) discloses a device using a convex mirror mounted on adjustable arms that are mounted on the butane bottles on a travel trailer or house trailer. This is not useable on boat trailers, utility trailers, or any trailer not having gas bottles mounted on the trailer tongue.

U.S. Pat. No. 3,858,966 to Lowel (1974) discloses a complicated device that attaches to the trailer and the towing vehicle. The towing vehicle and the trailer must be in proximity and must be substantially aligned before the device can be connected to the vehicle. This device is very difficult to store, virtually impossible to keep aligned, and uses a flat mirror that gives a very small field of vision.

Lanio Industries Inc., of Miami, Fla., sells an alignment aid under the trademark Oneshot. It is made to remain on the trailer in the upright position where rocks and other road debris can break its mirrors. It has a base that mounts on the top of the trailer tongue making it nearly impossible to walk out on a boat trailer tongue to retrieve a boat. The unit is made of two telescoping square tubes. To adjust the height the user must have a Phillips screwdriver and a wrench to loosen and retighten the locking bolt. It does not have any positive locking positions to enable the user to return the telescoping tube to any preset positions. The device has a base that allows a maximum of 30 degrees rotation forward, limiting the distance from the hitch to the mounting position. If the support is removed for separate storage, the user must also remove two bolts, using wrenches, and when reassembled, the device will have to be realigned before it can be used.

OBJECTS AND ADVANTAGES

Accordingly, the objects and advantages of the hitch viewing mirror apparatus of the present invention are to provide:

(a) an improved trailer hitch remote viewer;

(b) a mirror apparatus that allows a vehicle driver to mate a towing hitch to a receiver hitch without exiting a vehicle until the alignment is complete;

(c) a mirror apparatus for allowing a vehicle driver views of a hitch and the area between a trailer and a towing vehicle;

(d) such an apparatus that:
  (1) is easily adjustable for all vehicles from small passenger cars, to utility vehicles, to large pickup trucks;
  (2) allows the mirrors to be easily adjusted for viewing and locked in the desired position after adjustment;
  (3) fits on any trailer with a tongue;
  (4) can be rotated and stored on a trailer as a complete unit or can be stored on a trailer with the mirror assembly removed and stored separately;
  (5) provides a support assembly that can be removed, from the base assembly attached to a trailer, and stored to prevent theft of the support assembly and the mirror assembly without having to use any tools;
  (6) can be attached to a trailer and adjusted, and will remain in adjustment after using, storing and reusing, as long as the base assembly is not relocated on the trailer tongue;
  (7) can be quickly and easily used on a number of trailers by providing each trailer with its own mounted base assembly;
  (8) can be easily removed from a trailer tongue for storage or for use on another trailer;
  (9) will withstand the rigors of the weather and the corrosive effects of salt water;
  (10) will not interfere with trailer components, mounted on a trailer tongue, such as winch supports, braces, or butane bottles;
  (11) has a telescoping support to allow storage in a storage clip, on the trailer tongue, without hitting the face of a trailer, or the bow of a boat, on a boat trailer;
  (12) allows the convex mirror to fold over the flat mirror, face to face, thus protecting both mirrors from damage during storage or while traveling, and
  (13) will remain in permanent alignment after being used, stored and reused.

Further objects and advantages are to provide a hitch viewing mirror apparatus that is small, compact, easy to use, easy to store, inexpensive to manufacture, and can be installed and used by the average individual without mechanical skills. Still further objects and advantages will become apparent in the following discourse.

DRAWING FIGURES

FIG. 1. shows an isometric view of a mirror apparatus in accordance with my invention, attached to a section of rectangular steel tubing trailer tongue.

FIG. 7B shows an enlarged, side view of the base assembly with the adjustable stop in a near vertical position.

FIG. 7C shows an enlarged, partial plan view of the base assembly with the striated faces disengaged.

FIG. 7D shows an enlarged, side view of the base assembly with the adjustable stop rotated to 45 degrees from the vertical.

FIG. 7E shows an enlarged, side view of the base assembly with the rotating support rotated to contact the adjustable stop.

FIG. 10A shows an enlarged view of the end fitting for clarity of the alignment notch.

Figure 1:
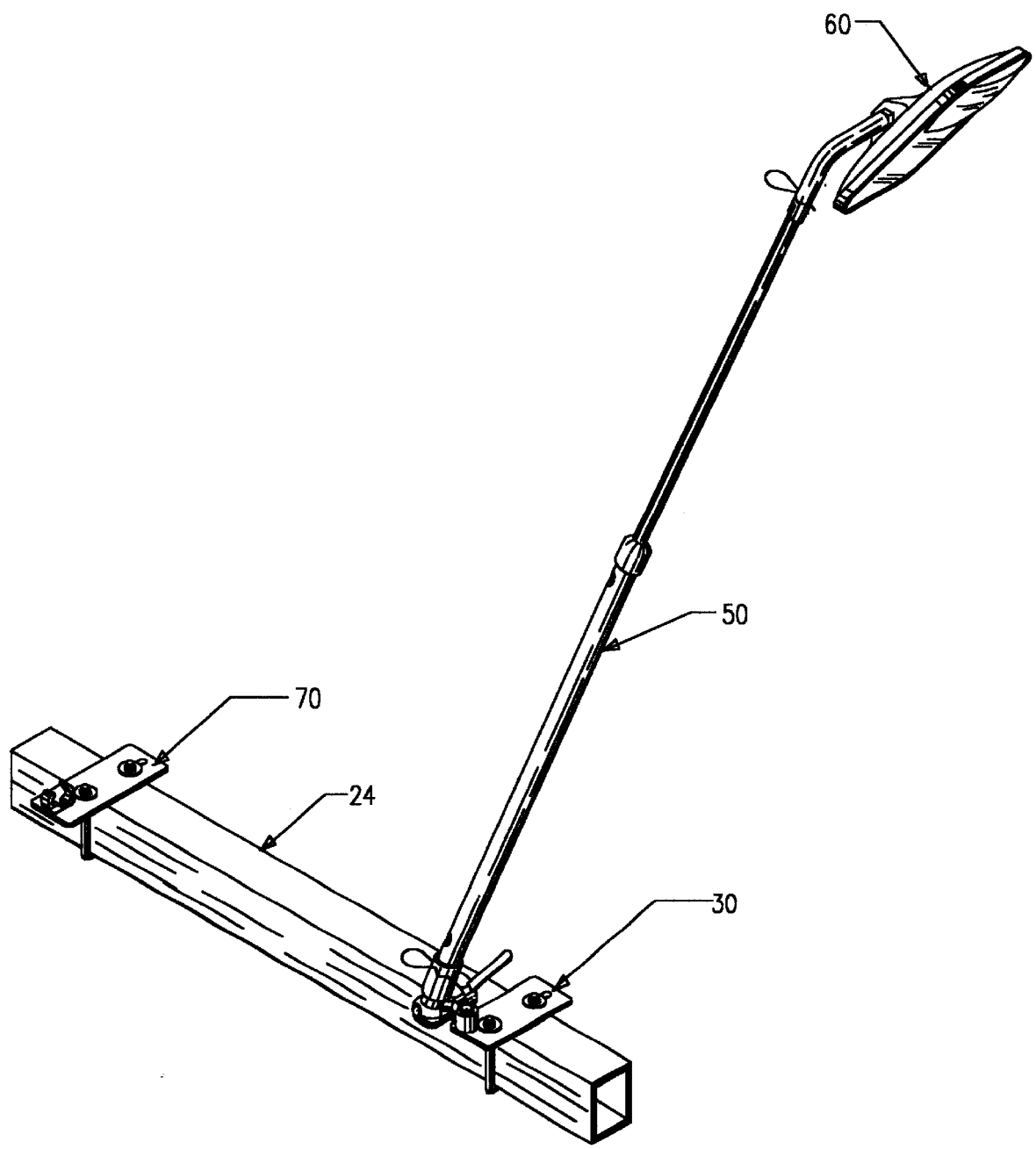

REFERENCE NUMERALS IN DRAWINGS 20 pickup truck
22 trailer tongue jack
24 trailer tongue assembly
26 automobile
31 base pivot bolt
33 coil compression spring
35 base bracket
37 base pivot bolt lock nut
39 coupling
40 base plate U-bolt
42 base mounting bolt washer
44 base plate U-bolt lock nut
46 base plate
46b base plate U-bolt hole
50 telescoping support assembly
51a lower countersunk hole
51c upper countersunk hole
51e alternative outer support tube
52a fitting hole
52c reducing fitting
53a retainer tube hole
54a spring hole
56 pushbutton
57a pushbutton hole
57c mirror bracket hitch pin hole
57e solid telescoping element
60 mirror assembly
61a bracket alignment slot
62 bushing
64 flat mirror
66 mirror mounting bolt
68 bracket alignment pin hole
71 storage assembly U-bolt
73 storage assembly U-bolt lock nut
75 spring clip
76a storage plate slot
76c clip bolt hole
78 clip bolt lock nut
80 winch support assembly
89a alignment slot
90 vertical bracket tube
92 horizontal bracket tube
94 round flat mirror unit
95a round mirror attachment bolt hole
96a convex mirror bracket sleeve hole
97a flat mirror bracket mounting bolt hole
99 spring washer
101 alternative support assembly
103 second alternative mirror assembly 21 vehicle ball hitch
23 trailer receiving hitch
25 utility vehicle
30 base assembly
32 rotating support
34 adjustable stop
36 cam lock handle
38 coupling hitch pin
39a coupling hitch pin hole
41 base mounting bolt
43 base mounting bolt lock nut
45 base plate U-bolt washer
46a base plate slot
46c base mounting bolt hole
51 outer support tube
51b outer support tube hitch pin hole
51d outer support tube alignment hole
52 fitting
52b hole and alignment notch
53 retainer tube
54 spring retainer plug
55 pushbutton spring
57 telescoping tube
57b alignment groove
57d alignment spline
58 alignment pin
61 90 degree bracket
61b bracket hitch pin hole
63 lock washer
65 convex mirror
67 bracket hitch pin
70 storage clip assembly
72 storage assembly U-bolt washer
74 clip bolt
76 storage plate
76b storage plate U-bolt hole
77 clip bolt washer
79 spacer
89 bracket coupling
89b bracket hitch pin hole
91 90 degree elbow
93 round convex mirror unit
95 mirror attachment bolt
96 round convex mirror bracket
97 round flat mirror bracket
98 mirror mounting bolt sleeve
100 flat washer
102 first alternative mirror assembly

SUMMARY

The present invention is a mirror apparatus for visual alignment during trailer hitch-up. It uses the vehicle's rearview mirror, and a combination of convex and flat mirrors mounted on an offset bracket that can be removed for storage or can remain attached a telescoping support for storage on the trailer. The bracket that supports the mirrors contains an alignment slot that aligns with an alignment spline or an alignment pin on the upper end of the telescoping support. Once they are aligned they will remain in alignment after use and storage. The telescoping support height can be adjusted for large vehicles such as pickup trucks or smaller vehicles such as automobiles. A pushbutton arrangement holds the telescoping support at the proper height for viewing and allows the support to be lowered for storage so that it will clear the front of the trailer or boat when rotated into its storage position. When the apparatus is rotated back into its viewing position for use, the telescoping support is extended until the pushbutton locks the support at the proper height without any adjustments. The outer support tube fits into a coupling, mounted on the base, containing alignment holes. A hitch pin is inserted through the holes to retain the support assembly in alignment. Removal of the hitch pin allows the support and mirror assembly to be removed for separate storage. When the support is reinstalled in the coupling, the hitch pin is inserted through the alignment holes and the alignment is maintained without adjustment. The coupling is offset on the base to allow the support assembly to be rotated into its storage clip, attached to the trailer tongue, without interfering with anything mounted on the tongue, such as a winch support. The adjustable base is constructed to allow the support coupling to rotate by turning a cam lock handle. The smooth faces of the base assembly are allowed to rotate while the striated faces of the base assembly hold the preset position of the adjustable stop. When the support assembly is rotated from the storage to the viewing position, the stop will maintain the proper angle of the support and mirror assemblies without further adjustment. The base assembly can rotate horizontally 360 degrees and is mounted on a trailer tongue.

Description

A. The term "apparatus" or "mirror apparatus" is used to denote the entire device of my invention. The term "assembly" is used to denote several elements joined into a single unit. The apparatus contains four basic assemblies, a base assembly, a telescoping support assembly, a mirror assembly, and a storage clip assembly. There are three alternative assemblies, the alternative support assembly, the first alternative mirror assembly, and the second alternative mirror assembly. Hitches and other assemblies are also shown.

FIG. 1—Isometric View

A preferred embodiment of the mirror apparatus is shown in an isometric view in FIG. 1, in its upright and extended position. It is constructed entirely of aluminum except for the springs, bolts, nuts, and washers; these are stainless steel. Plastic, nylon, fiberglass, aluminum, stainless steel, heavy galvanized steel, or other materials resistant to weathering and corrosion can also be used. The apparatus has four basic assemblies, a base assembly 30 which is attached to a section of trailer tongue assembly 24, a telescoping support assembly 50 which is attached to base assembly 30, a mirror assembly 60 which is attached to a telescoping support assembly 50, and a storage clip assembly 70 which is attached to trailer tongue assembly 24.

FIG. 2—Side View

Figure 2:
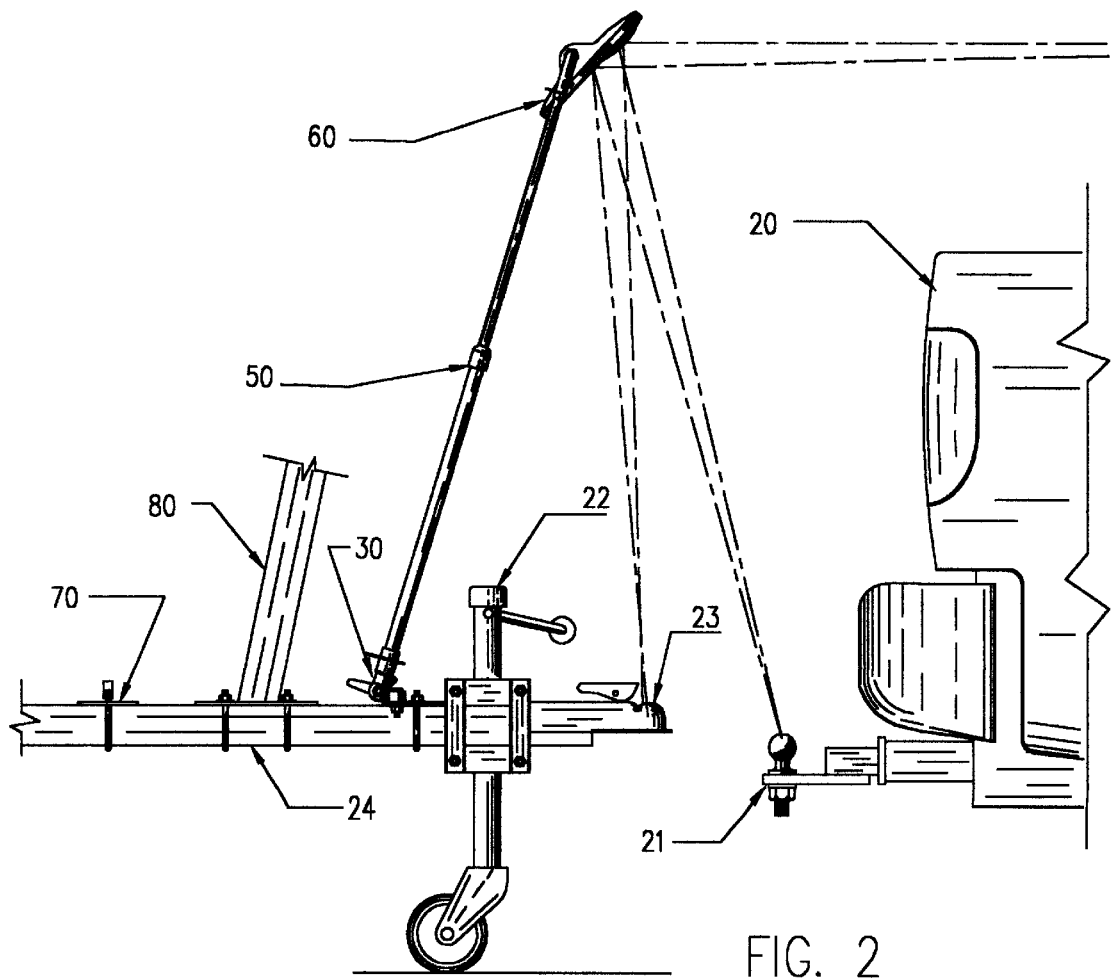
FIG. 2 shows a side view of the mirror apparatus, attached to a trailer tongue, with a telescoping support in its fully extended position for a pick-up truck or other large vehicle.

A side view of the mirror apparatus attached to trailer tongue assembly 24 and a pickup truck 20 is shown in FIG. 2. Base assembly 30 is mounted on trailer tongue assembly 24 directly behind a trailer tongue jack 22. Base 30 can be mounted at any convenient location on tongue 24. Storage clip assembly 70 is attached to tongue 24 at a position close enough to base 30 to store telescoping support assembly 50 in storage clip assembly 70. Telescoping support assembly 50 is fully extended and angled forward over trailer receiving hitch 23. This gives the vehicle driver unobstructed sight lines from the rear view mirror of truck 20 to the combination flat and convex mirror assembly 60, which projects an image of a vehicle ball hitch 21 and trailer receiving hitch 23 to the vehicle driver.

FIG. 3—Plan View

Figure 3:
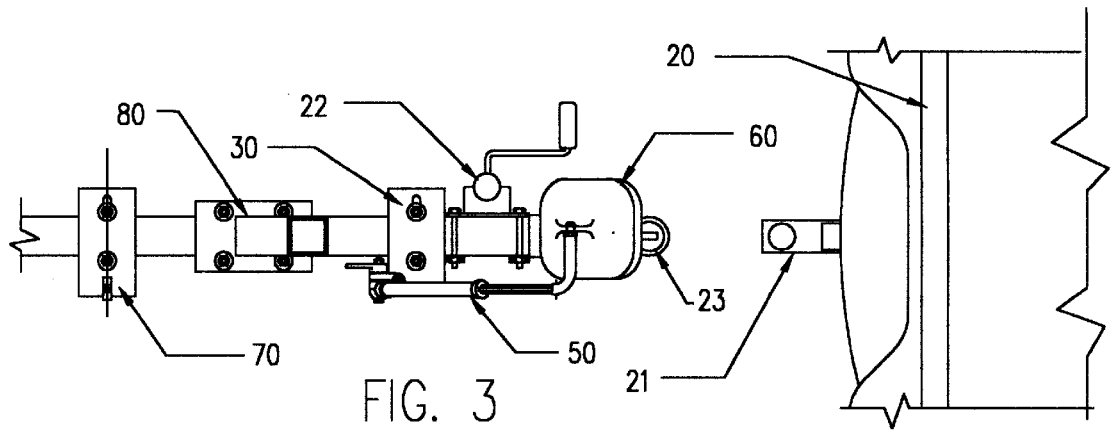
FIG. 3 shows a plan view of the mirror apparatus attached to the trailer tongue.

The plan view of FIG. 3 shows how base 30 is offset to the side of trailer tongue 24 to avoid any trailer components attached to the tongue. This avoids interference with winch support 80, braces, or butane bottles on A-frame tongues, when rotating the apparatus. Clip assembly 70 is also offset to the side of the tongue 24 for storage of support assembly 50. Support assembly 50 is angled forward to place mirror assembly 60 over hitch 23. The mirrors of assembly 60 are offset to the center of tongue 24.

Figure 5:
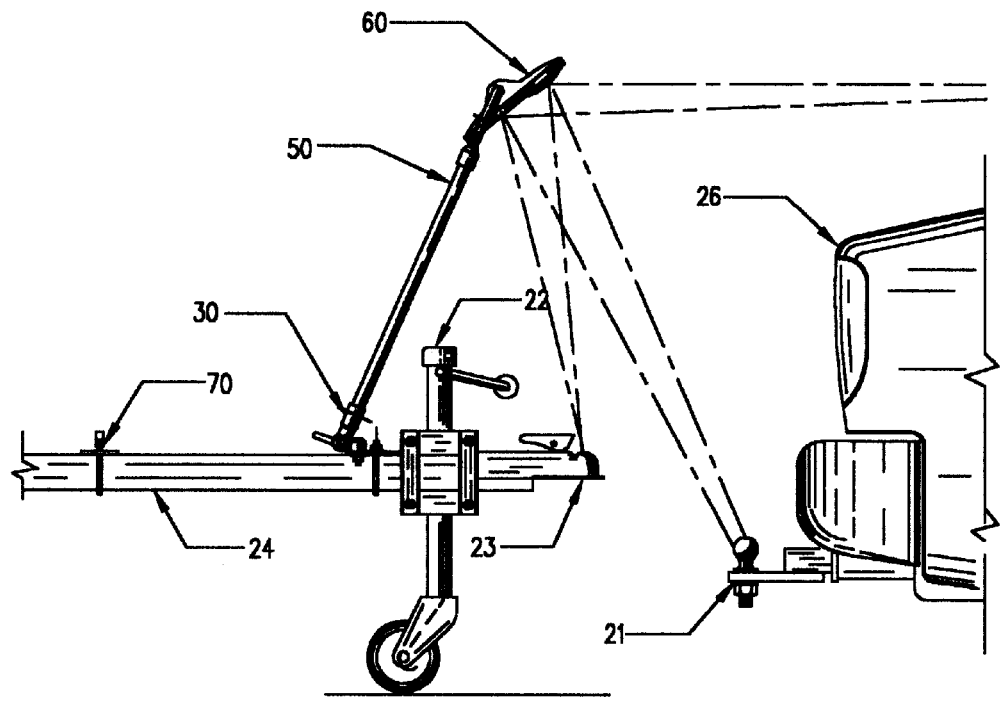
FIG. 5 shows a side view of the mirror apparatus, attached to the trailer tongue, with the telescoping support adjusted to its lowest position for automobiles or other small vehicles.
Figure 4:
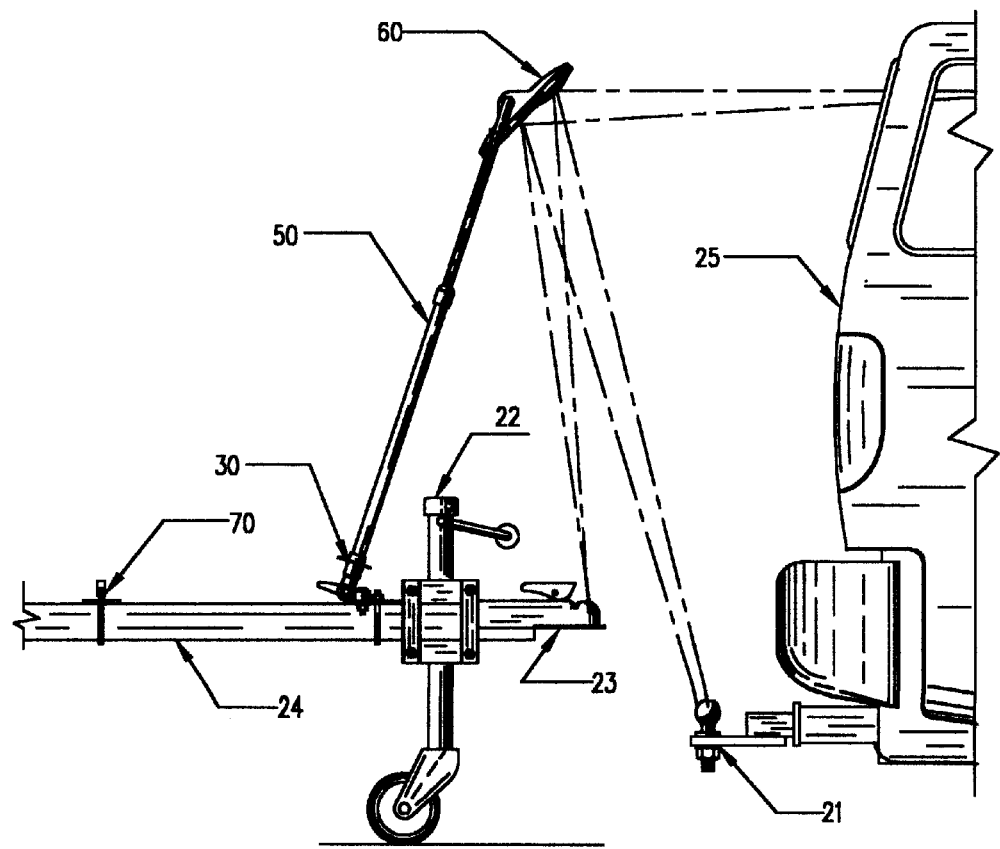
FIG. 4 shows a side view of the mirror apparatus, attached to the trailer tongue, with the telescoping support adjusted to the mid range position for a utility vehicle or other midsize vehicles.

FIGS. 4 and 5—Side Views

FIG. 4 shows a side view of the apparatus. This view is similar to FIG. 2 with the exception that it shows the sight lines for a utility vehicle 25, and does not show winch support 80. The length and angle of telescoping support 50 are adjusted to maintain the proper sight lines.

FIG. 5 shows a side view of the apparatus. This view is similar to FIG. 2 with the exception that it shows the sight lines of an automobile 26, and does not show winch support 80. The length and angle of telescoping support 50 are adjusted to their lowest position to maintain the proper sight lines.

FIG. 6—Side View

Figure 6:
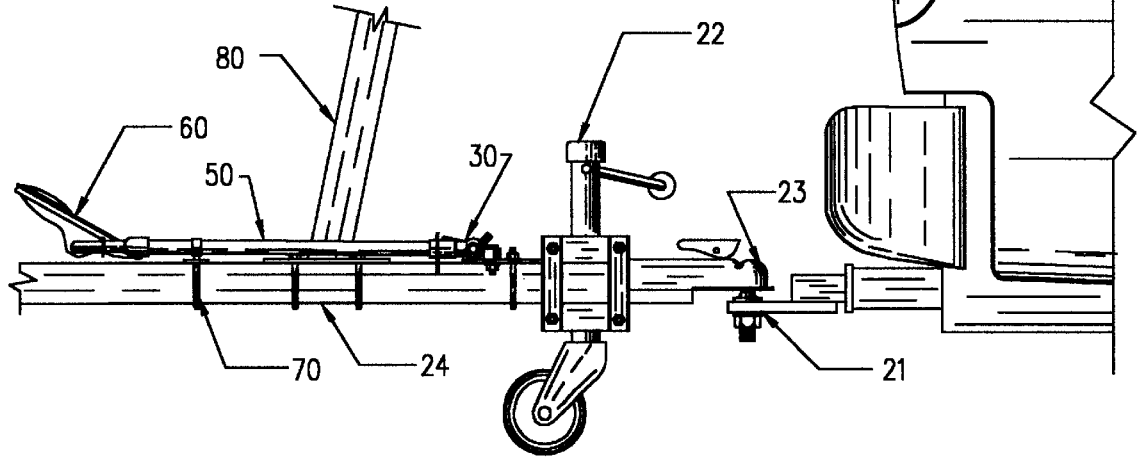
FIG. 6 shows a side view of the mirror apparatus, attached to the trailer tongue, with the mirror assembly and the support assembly rotated and stored in the storage clip assembly.

A side view of hitch 23 attached to hitch 21 on pickup truck 20 is shown in FIG. 6. Trailer jack 22 has been raised for traveling and the support and mirror assemblies have been rotated and stored in storage assembly 70. In this case mirror assembly 60 has been left on the telescoping support 50 for storage in expectation of using the mirror apparatus frequently.

Figure 7:
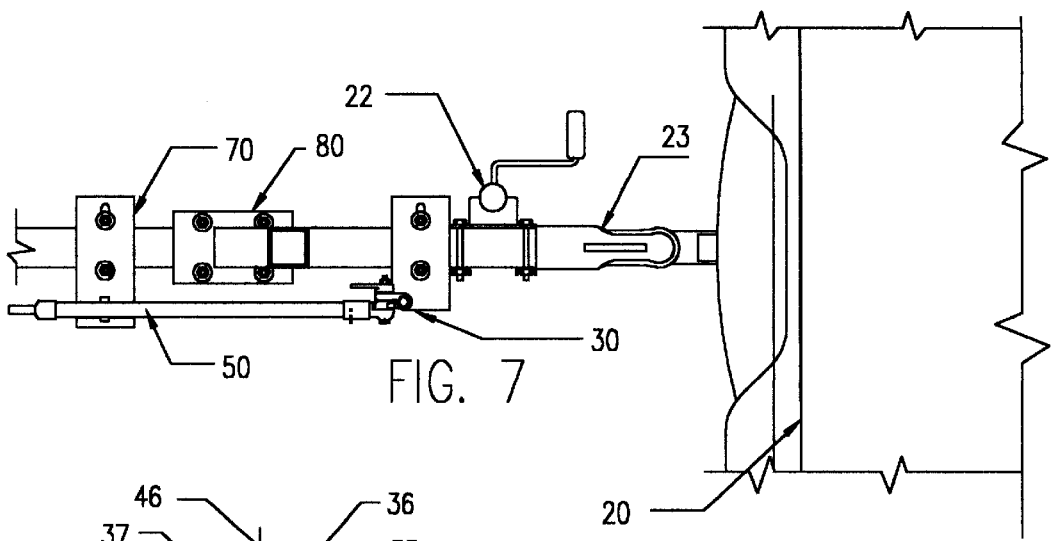
FIG. 7 shows a plan view of the mirror apparatus, attached to the trailer tongue, with the mirror assembly removed for separate storage and the support assembly rotated and stored in the storage clip assembly.
Figure 7A:
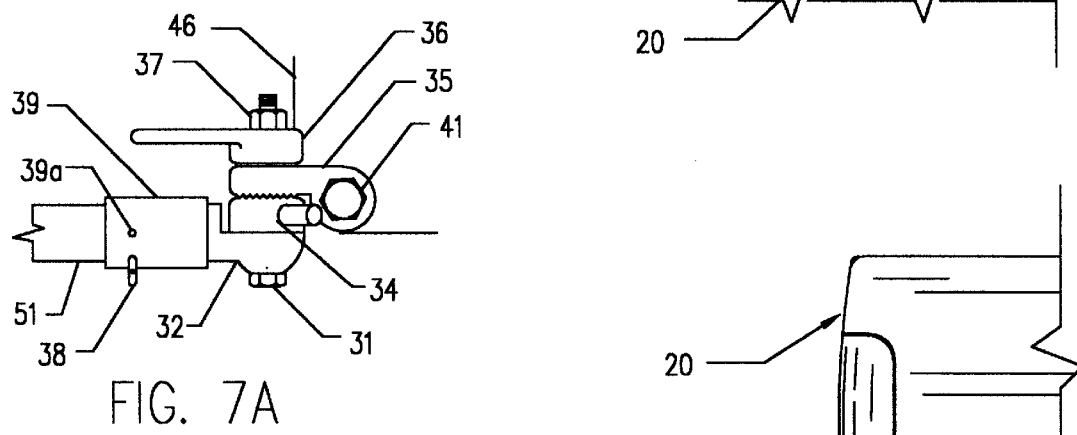
FIG. 7A shows an enlarged partial plan view of a base assembly of the mirror apparatus with the striated faces mated and locked.

FIGS. 7 and 7A—Plan Views

FIG. 7 shows a plan view of FIG. 6 with mirror assembly 60 removed for separate storage. This is done when the user does not anticipate using the mirror apparatus in the near future, or to prevent theft.

A partial enlarged plan view of base assembly 30 is shown in FIG. 7A. The enlarged view is for clarity, showing the various parts and their relationship to each other. A tubular outer support tube 51 is inserted into the smooth female end of a coupling 39, and secured by a hitch pin 38 inserted through alignment holes 39a and 51b in coupling 39 and support 51. Coupling 39 has a smooth hole in one half and female threads in the other half, and is threaded onto the male threaded, round projection of a rotating support 32. Support 32 is a hemisphere with an integral cylinder, projecting from its edge. The centerline of the cylinder aligns with the flat face of the hemisphere so that one half of the diameter of the cylinder overhangs the flat face of the hemisphere. The cylinder has male threads matching the female threads of coupling 39 and contains a hole through the center of the hemisphere normal to the cylindrical projection, for a base pivot bolt 31. Support 32 rotates around bolt 31, down for horizontal storage, and up for use.

An adjustable stop 34 has a horizontal, cylindrical body, of the same diameter as the hemisphere of support 32. An integral cylinder, whose diameter is approximately one half of the length of the body cylinder, projects radialy from the round surface of the cylindrical body, to form a stop. The cylinder has a flat face on the proximal end, and a striated face on the distal end. A hole for bolt 31 passes through the center of the cylinder. Adjustable stop 34 rotates around bolt 31 to position the stop at the desired angle. Mirror assembly 60 is aligned over trailer hitch assembly 23.

A base bracket 35 has a horizontal, cylindrical body, having the same diameter as stop 34. The cylindrical body has a striated face contiguous to and meshing with the striated face of adjustable stop 34. The other face has two circular sloping ramps with the high point of each ramp 180 degrees apart, forming two cams. There is a hole between the faces on the centerline of the cylindrical body for bolt 31. Projecting from the surface of the horizontal cylindrical body is a smaller vertical cylinder. A hole in the center is for a base mounting bolt 41 perpendicular to bolt 31. This projection is disposed to one side of the cylindrical body. The tangent of the offset cylinder is aligned with the cam face of the body. The top end face of the vertical cylinder is even with the center of the body. The bottom end face of the vertical cylinder is tangent to the bottom surface of the cylindrical body. The horizontal cylindrical body and the vertical cylindrical projection are constructed in one piece. A coil compression spring 33, (FIG. 9), is placed around bolt 31 and between the striated faces of stop 34 and bracket 35. The striated faces have been recessed to accommodate the compressed spring 33 when they are fully engaged.

A cam lock handle 36 has a cylindrical body of the same diameter as the base bracket 35. A handle projects radial from the round surface of the cylindrical body. The distal face of the handle is flush with the distal end face of the cylindrical body. The proximal end face of the cylindrical body has a circular groove that matches the circular cam ramps on the face of base bracket 35. This groove has two ridges 180 degrees apart that force the cylindrical body to tighten all of the pieces as cam lock handle 36 is rotated so the ridges slide up the cam ramps. A lock nut 37 on bolt 31 holds the unit together.

FIGS. 7B, 7C, 7D, and 7E—Side and Plan Views

In FIGS. 7B through 7E, telescoping support assembly 50 has been removed from coupling 39 because of space limitation of the paper size. FIG. 7B is a side view of base assembly 30 showing cam lock handle 36 in the horizontal, locked position, and the radial projecting stop of adjustable stop 34 is in a nearly vertical position.

In the partial plan of base assembly 30, FIG. 7C, the radial projecting stop of adjustable stop 34 is still in its nearly vertical position. Cam lock handle 36 has been rotated to its vertical position and the striated faces of stop 34 and base bracket 35 are disengaged to allow positioning of the radial projection by rotating stop 34 about base pivot bolt 31.

The side view of base assembly 30, shown in FIG. 7D, shows adjustable stop 34 rotated to position the radial projecting stop at approximately 45 degrees from the vertical. Cam lock handle 36 is shown in the vertical, and unlocked position.

FIG. 7E is a side view of base assembly 30 with cam lock handle 36 in the horizontal, locked position. Rotating support 32, and coupling 39 have been rotated around base pivot bolt 31 until rotating support 32 contacts the radial projecting stop of adjustable stop 34.

Figure 8:
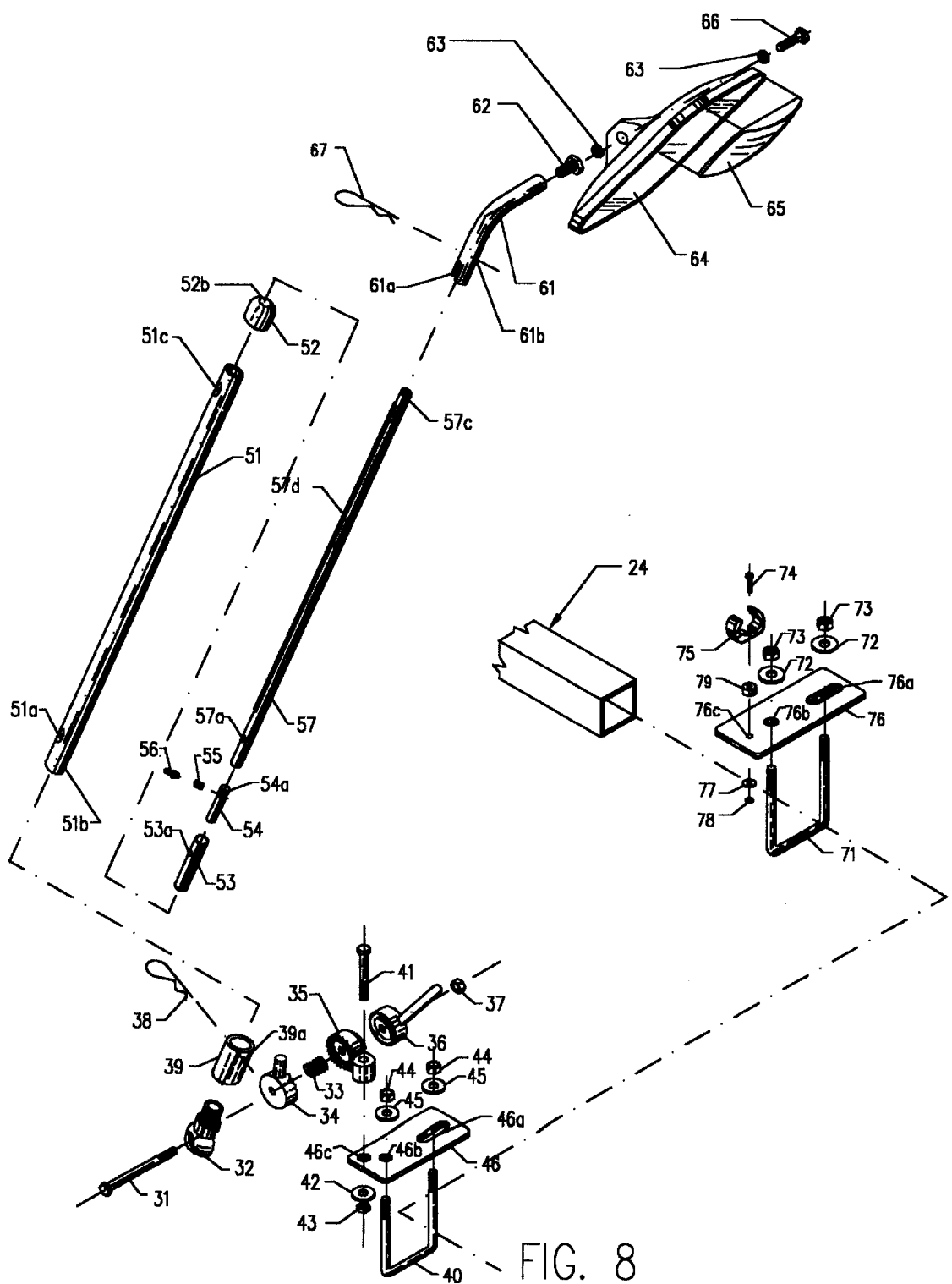
FIG. 8 shows an exploded isometric view of the complete mirror apparatus.

FIG. 8—Exploded Isometric View

A exploded isometric view of the entire mirror apparatus including storage clip assembly 70 is shown in FIG. 8. Enlarged exploded isometric views of each assembly are shown in FIGS. 9 through 12. FIG. 8 shows how base assembly 30 connects to telescoping support assembly 50 that connects to mirror assembly 60. FIG. 8 also shows how base assembly 30 and storage clip assembly 70 are attached to trailer tongue 24.

Figure 9:
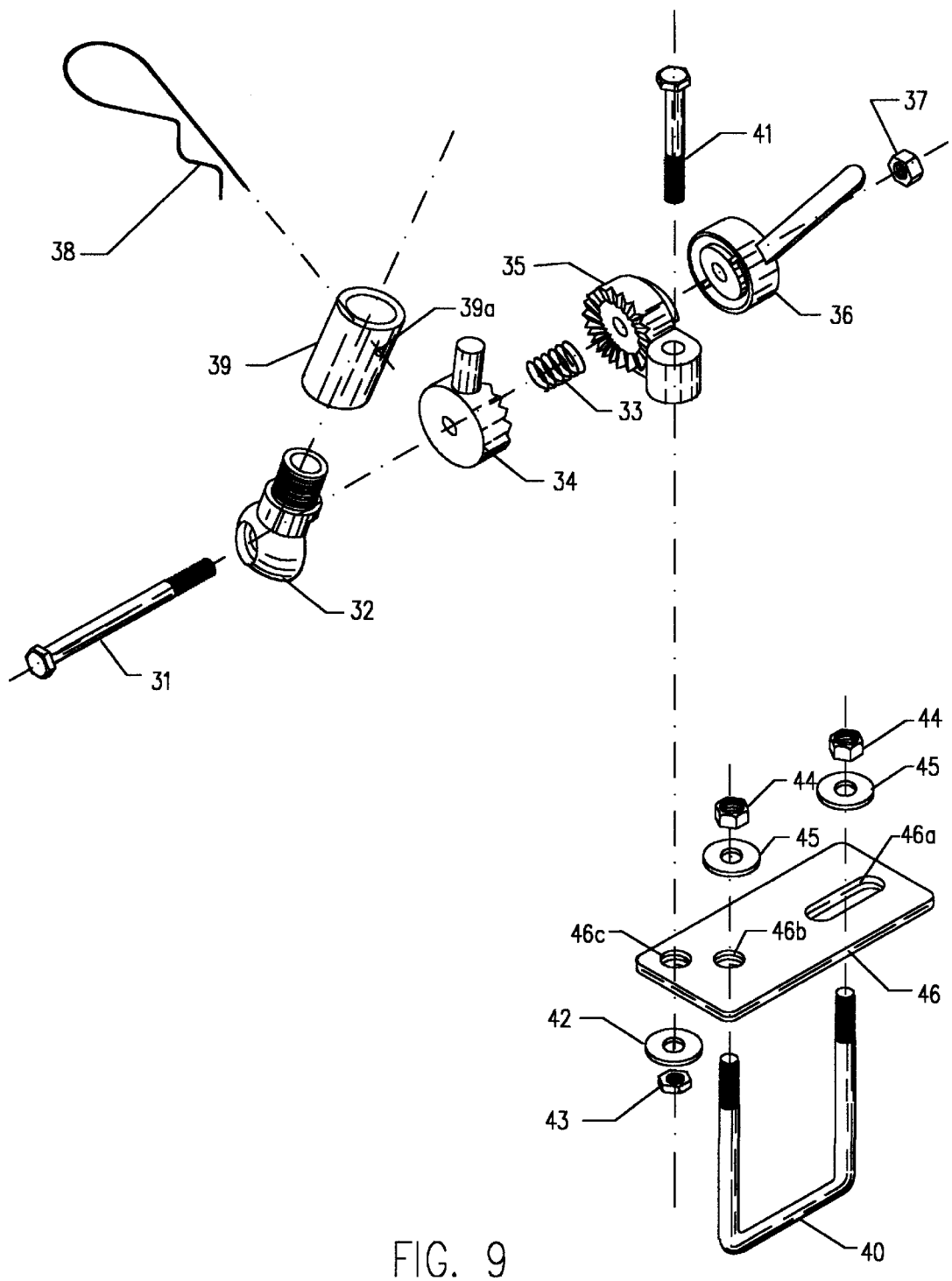
FIG. 9 shows an enlarged exploded isometric view of the base assembly of the mirror apparatus.

FIG. 9—Enlarged, Exploded Isometric View

A exploded isometric view of base assembly 30 is shown in FIG. 9. A base plate U-bolt 40 fits under and adjacent to each side of trailer tongue assembly 24 and the threaded ends protrude through a base plate U-bolt hole 46b and a base plate slot 46a of a base plate 46 positioned on top of the trailer tongue. Base plate 46 is a rectangular plate approximately ¼" thick, 3" wide, and 7" long. U-bolt washer 45 is placed on each end of U-bolt 40 and a base plate U-bolt lock nut 44 is threaded on each end of U-bolt 40 and tightened to prevent movement of base plate 46. Base mounting bolt 41 goes through the hole in base bracket 35, through a base mounting bolt hole 46c in plate 46 and a base mounting bolt washer 42 is placed over bolt 41 and a base mounting bolt lock nut 43 is threaded on bolt 41 and tightened.

Base pivot bolt 31 passes through rotating support 32, through adjustable stop 34, through coil compression spring 33, through bracket 35 containing two sloping cams on the side opposite from the striated face, through cam lock handle 36 containing a groove and two ridges that fit the sloping cams of bracket 35. A base pivot bolt lock nut 37 is threaded onto bolt 31 and adjusted so that rotating support 32 will rotate when handle 36 is rotated slightly. Rotating handle 36 fully will allow the striated face of stop 34 to disengage from the striated face of base bracket 35, to permit rotation of stop 34. Coupling 39 has a female thread on one end. Screw coupling 39 to male threads on support 32. A coupling hitch pin 38 is inserted through coupling hitch pin hole 39a in the top half of coupling 39 and outer support tube hitch pin hole 51b after a outer support tube 51 has been inserted into coupling 39.

Figure 10:
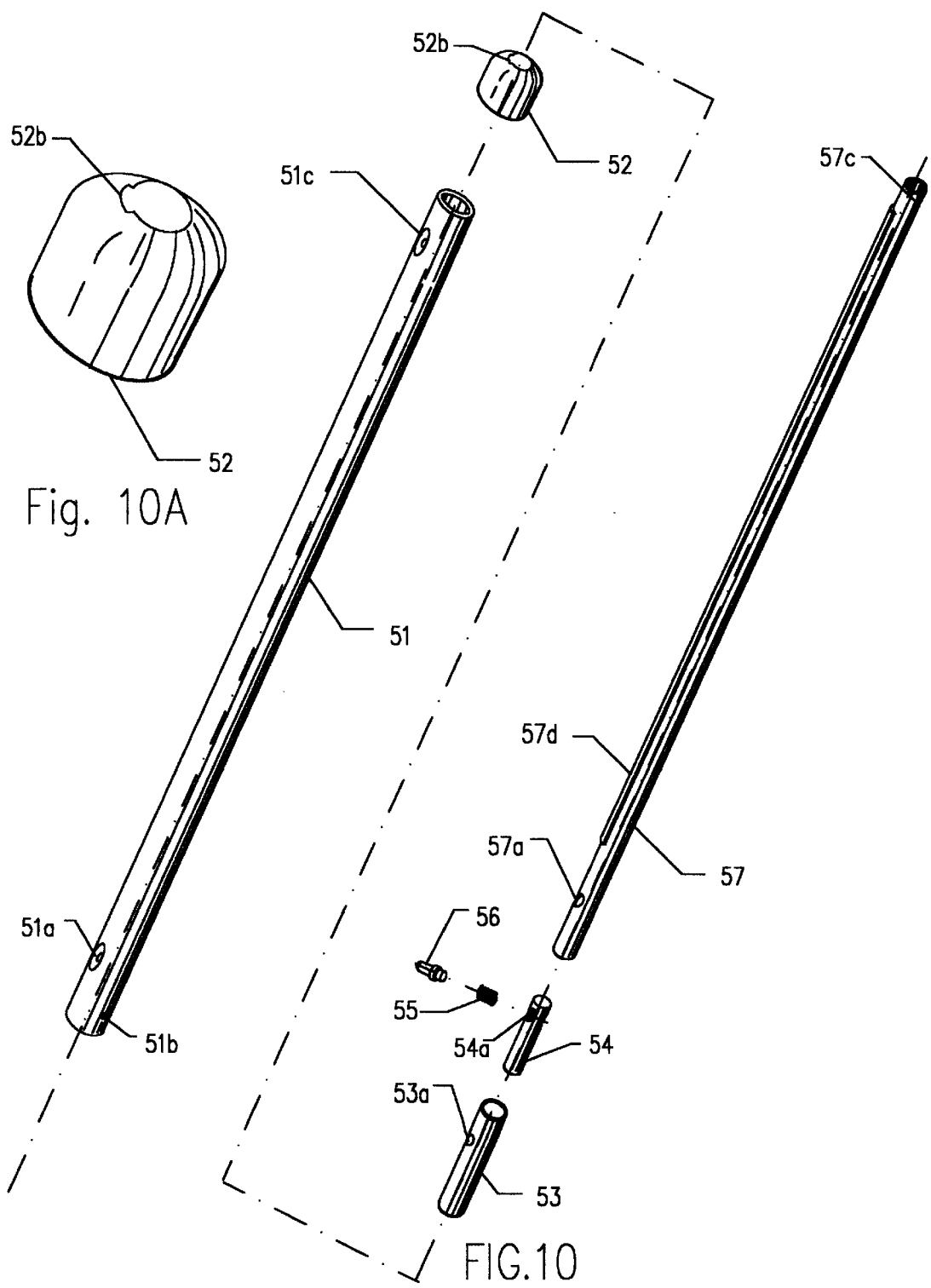
FIG. 10 shows an enlarged exploded isometric view of a telescoping support assembly of the mirror apparatus.

FIG. 10—Enlarged, Exploded Isometric View

An enlarged, exploded isometric view of telescoping support assembly 50 is shown in FIG. 10. Outer support tube 51 is a round tube approximately 1¼" outside diameter by 24" long with sufficient wall thickness to remain rigid while supporting mirror assembly 60, and contains alignment hole 51b disposed near the lower end. There is a lower countersunk hole 51a disposed above hole 51b, and a upper countersunk hole 51c near the top of support 51. A fitting 52 is a means for reducing the inner diameter of support 51, to accommodate the outside diameter of telescoping element 57, and can be adapted from a pipe cap or a reducing fitting. Fitting 52 is attached to the upper end of support element 51 and contains a hole and alignment notch 52b that telescoping tube 57 will pass through. Telescoping tube 57 is approximately ¾" outside diameter by 24" long. A spring retainer plug 54 is a solid cylinder with a diameter slightly smaller than the inside diameter of telescoping element 57, and is inserted into the lower end of telescoping element 57. A spring hole 54a, with a diameter slightly larger than a pushbutton spring 55, is bored through plug 54. Hole 54a in spring retainer plug 54 is aligned with a hole 57a in the lower end of telescoping element 57. Pushbutton spring 55 is inserted into aligned holes 57a and 54a, followed by insertion of a pushbutton 56, a cylinder whose proximal end has a diameter slightly less than holes 51a, and 51c, and is rounded on the end. The distal end of the cylinder has a diameter equal to the outside diameter of spring 55, and the length of the cylinder is dependent on the wall thickness of tube 51 and tube 57. A retainer tube 53 is a tube with a outer diameter slightly smaller than the inner diameter of tube 51, with a inner diameter slightly larger than the outside diameter of tube 57, and with a length the same length as plug 54. Tube 53 is slipped over the lower end of tube 57 until hole 53a aligns with pushbutton 56. A alignment spline 57d is attached to tube 57 so that it fits against the top of retainer 53 and ends short of the upper end of tube 57. A hole 57c, at the upper end of tube 57, is for a hitch pin 67. Insert the assembly of items 53 through 57 into the outer support tube until pushbutton 56 protrudes through countersunk hole 51a.

Figure 11:
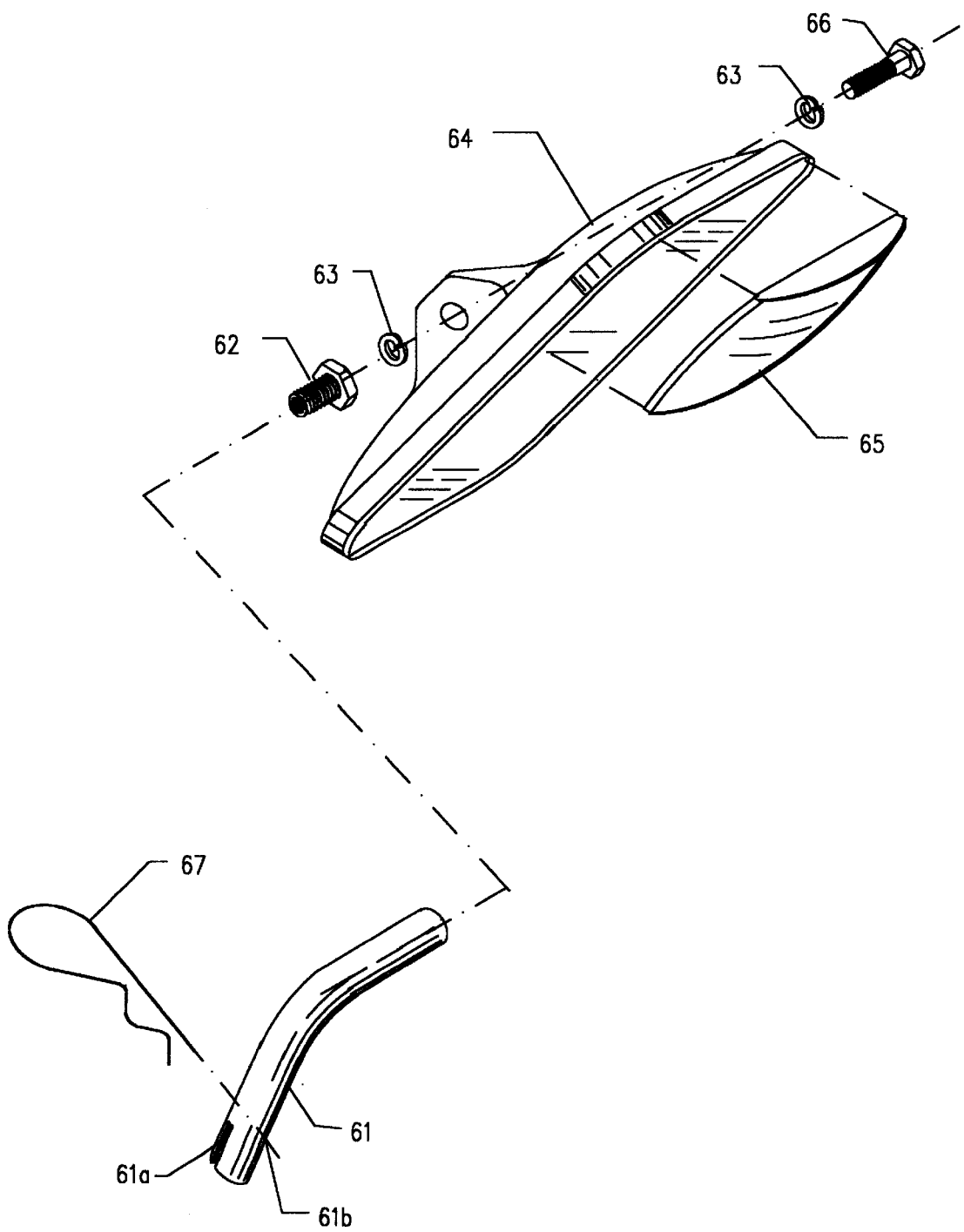
FIG. 11 shows an enlarged exploded isometric view of a mirror assembly of the mirror apparatus.

FIG. 11—Enlarged, Exploded Isometric View

An enlarged, exploded isometric view of mirror assembly 60 is shown in FIG. 11. A 90 degree bracket 61 is constructed of a single piece of tubing, bent 90 degrees, and sized to slip over the upper end of tube 57. The horizontal section of bracket 61 is long enough to allow the vertical section of bracket 61 to clear the edge of mirror 64. The lower end of bracket 61 contains a bracket hitch pin hole 61b and a bracket alignment slot 61a that mates with alignment spline 57d.

The distal end of bracket 61 is threaded to receive a bushing 62. After bushing 62 is threaded into the distal end of bracket 61, a mirror mounting bolt 66 is inserted through a lock washer 63, then through the hole in the mounting bracket, protruding from the rear of flat mirror 64, through a second lock washer 63 and into threaded bushing 62. This arrangement holds mirror 64, without slipping, and the alignment is changed by simply loosening bolt 66, adjusting rotating mirror 64, and retightening bolt 66.

A rectangular convex mirror 65, approximately 6" in width, and 4" in height is attached to flat mirror 64 with double-sided sticky tape or with mirror glue. Mirror 64 is a rectangular mirror with rounded corners, and a flat reflective surface approximately 8" in width and 12" in height. The frame and back are constructed of metal or plastic with a mounting bracket on the rear. The combination of mirror 64 and mirror 65 are adjusted, as one unit, to the proper angle and then bolt 66 is tightened to maintain the adjustment.

Bracket hitch pin 67 is inserted through a bracket hitch pin hole 61b and hole 57c to secure mirror assembly 60 to support assembly 50.

Figure 12:
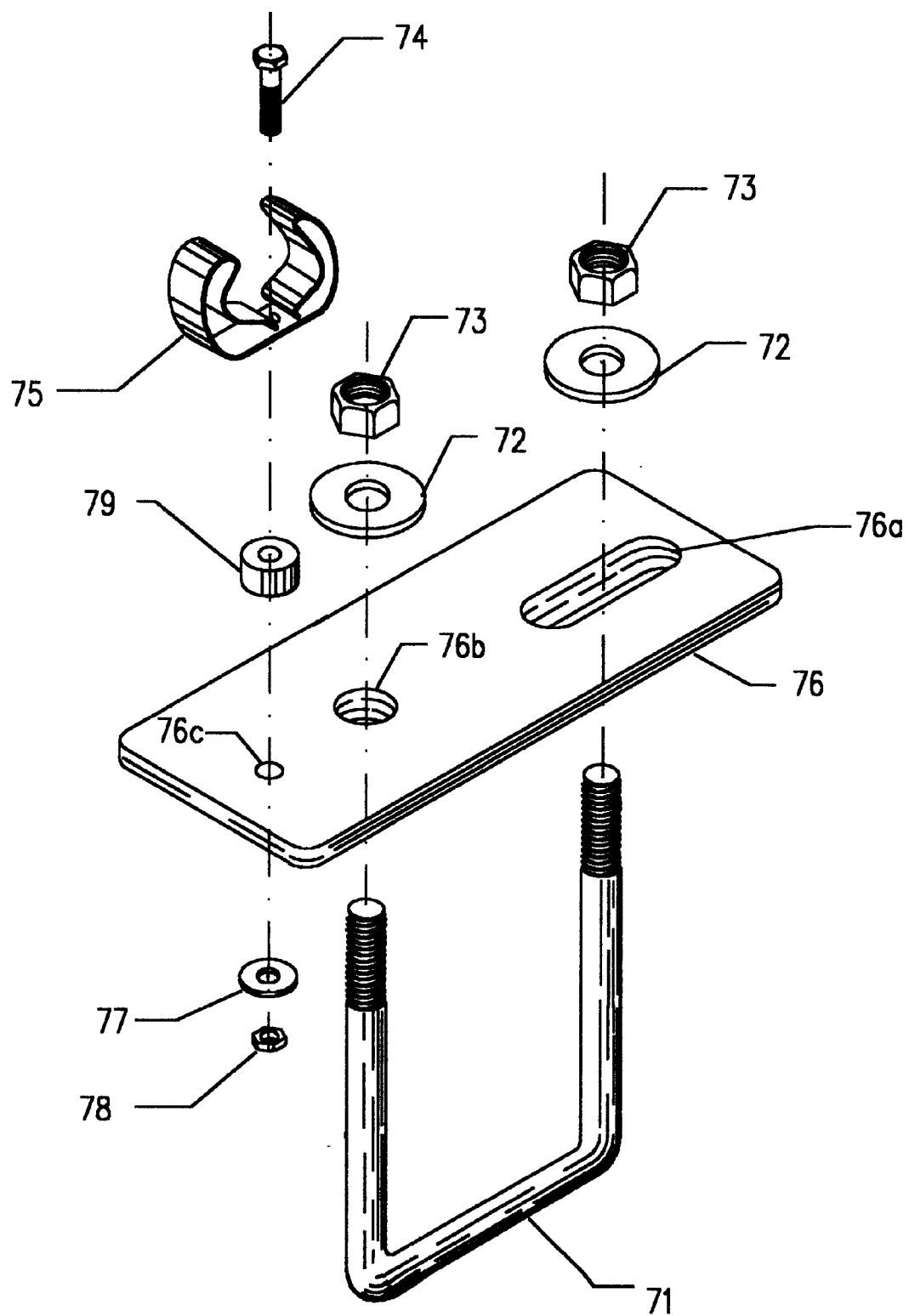
FIG. 12 shows an enlarged exploded isometric view of a storage clip assembly of the apparatus.

FIG. 12—Enlarged, Exploded Isometric View

FIG. 12 shows an exploded isometric view of storage clip assembly 70. A storage assembly U-bolt 71 is placed under trailer tongue 24 with the vertical legs of U-bolt 71 adjacent to the sides of trailer tongue 24. A rectangular storage plate 76, is approximately ¼" thick, 3" wide, and 7" long, is placed on top of trailer tongue 24 and over the ends of U-bolt 71 with one end through a storage plate U-bolt hole 76b and the other end through a storage plate slot 76a. A storage assembly U-bolt washer 72 is placed over each end of U-bolt 71 and a storage assembly U-bolt lock nut 73 is threaded on each end and tightened to hold plate 76 in place. A spring clip 75 is stainless steel, formed to grip outer support tube 51. Clip 75 is bolted to plate 76 using a clip bolt 74 through the hole in spring clip 75, through a round spacer 79, and through a clip bolt hole 76c in plate 76. Install a clip bolt washer 77 and a clip bolt lock nut 78 on bolt 74 and tighten.

Operation—FIGS. 2, 3, and 8

The manner of using this apparatus for visual alignment during trailer hitch-up consists of attaching base 30 to trailer tongue assembly 24 as shown in FIGS. 2, 3, and 8. The user inserts the lower end of telescoping support assembly 50 into coupling 39. The user then aligns and inserts hitch pin 38 through holes 39a and 51b. Next the user inserts the top end of telescoping tube 57 into the lower end of bracket 61, aligning the alignment slot 61a with alignment spline 57d. Finally the user inserts hitch pin 67 through holes 61b and 57c, locking mirror assembly 60 onto telescoping support assembly 50. If the vehicle is a large pickup truck 20, the user depresses pushbutton 56 and slides telescoping tube 57 up until pushbutton 56 protrudes through countersunk hole 51c, as shown in FIG. 2.

FIGS. 4, and 8

If the towing vehicle is a utility vehicle 25, the user depresses pushbutton 56 and slides telescoping tube 57 about half way up as shown in FIGS. 4, and 8. Pushbutton spring 55 and pushbutton 56 will furnish enough friction to hold telescoping tube 57 at any desired position.

FIGS. 5, and 8

If the vehicle is a automobile 26 as shown in FIG. 5, then the user leaves telescoping tube 57 in its down position as shown in FIG. 3, with pushbutton 56 protruding through countersunk hole 51a.

FIGS. 6 through 8

FIG. 7B is a side view of base 30 showing coupling 39 rotated to the horizontal position. Stop 34 is in a nearly vertical position and cam lock handle 36 is in the down and locked position. The user loosens cam lock handle 36 until the striated faces of base bracket 35 and adjustable stop 34 are disengaged by the expansion of compression spring 33, as shown in FIGS. 7C, and 8. The user turns rotating support 32 until it contacts the integral stop of adjustable stop 34. The user then rotates the assembly of rotating support 32, coupling 39, adjustable stop 34, support assembly 50, and mirror assembly 60 until mirrors 64 and 65 are centered over trailer hitch receiver 23. The user rotates handle 36 to reengage the striated faces of stop 34 and bracket 35, thus locking stop 34 in the desired position.

The user stands in front of the trailer with their eyes at the same level as the vehicle's rearview mirror. The user loosens bolt 66 and rotate mirrors 64 and 65 so that trailer receiving hitch 23 is visible in both mirrors 64 and 65 and that mirror 65 gives a good view of as much area as possible in front of the trailer. The user then tightens bolt 66 to hold mirrors 64 and 65 in alignment. The user backs the vehicle while looking into the vehicle's rearview mirror. The user will be able to see the trailer hitch in convex mirror 65 from a distance so that the vehicle can be more closely aligned as the vehicle approaches the trailer. As the vehicle gets closer to the trailer, flat mirror 64 shows a much enlarged view of vehicle hitch ball 21 and trailer hitch receiver 23. The user then slowly backs the vehicle until the hitches align.

After the hitch-up is complete, the user depresses pushbutton 56 and tube 57 is retracted into tube 51 until pushbutton 56 protrudes from hole 51a. The user rotates handle 36 slightly to allow rotation of support 32, coupling 39, hitch pin 38, telescoping support assembly 50, and mirror assembly 60. The user presses support tube 51 into clip 75 for storage after storage clip assembly 70 has been installed on trailer tongue assembly 24 as shown in FIG. 6. FIG. 7 shows the assembly in its storage position with mirror assembly 60 removed for separate storage.

To reuse the apparatus, the user loosens cam lock handle 36 slightly and rotates the telescoping assembly until rotating support 32 bears against the stop portion of adjustable stop 34. The user then retightens cam lock handle 36. The interlocking of the two striated faces will prevent the stop from slipping when pressure is applied against the stop. If mirror assembly 60 has been removed for storage, the user slips the lower end of mirror bracket 61 on to the end of telescoping tube 57, and the user reinserts hitch pin 67. The apparatus will remain in alignment without further adjustment.

Figure 13:
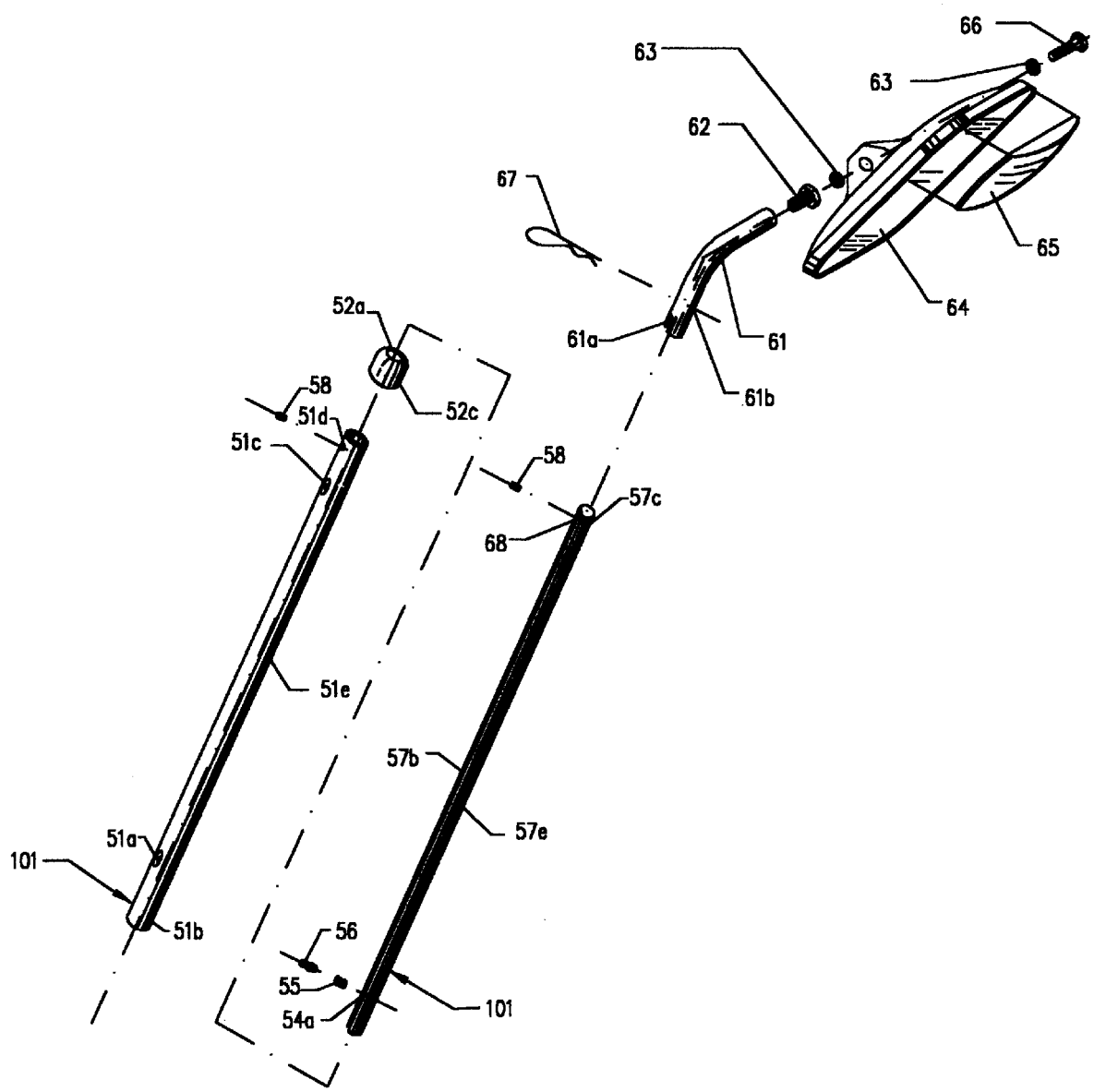
FIG. 13 shows an exploded isometric view of an alternative embodiment of the support assembly and the basic mirror assembly.

Alternative Embodiments—FIG. 13—is-Exploded Isometric View

FIG. 13 shows an alternative embodiment of telescoping support assembly 50, and its relationship to mirror assembly 60.

Figure 14:
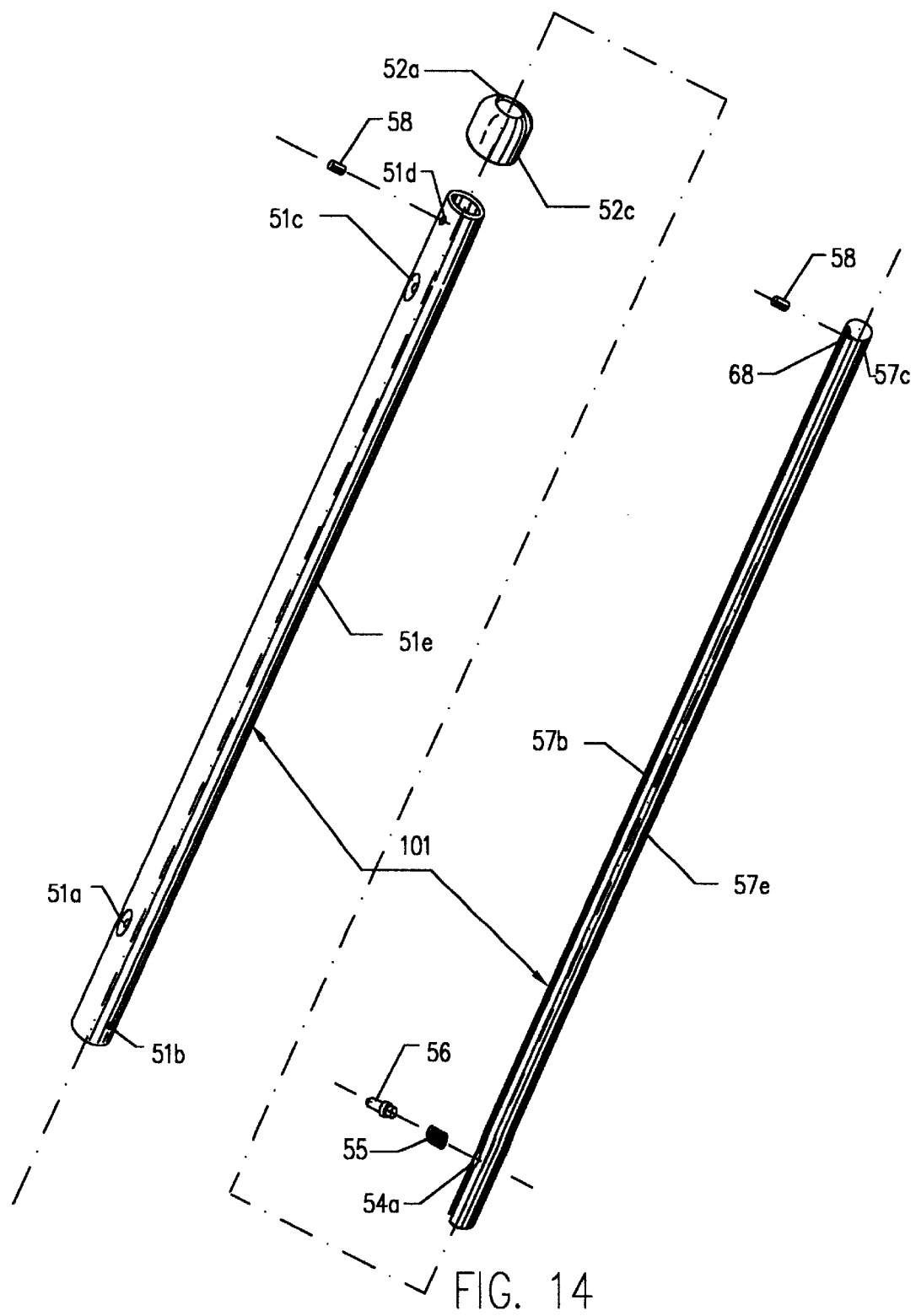
FIG. 14 shows an enlarged exploded isometric view of an alternative embodiment of the assembly.

FIG. 14—Enlarged, Exploded Isometric View

FIG. 14 shows an enlarged, exploded view of the same alternative embodiment of telescoping support assembly 50 as shown FIG. 13. A alternative outer support tube 51e is identical to support tube 51, with the exception that a outer support tube alignment hole 51d is drilled in the upper end of tube 51e, and a alignment pin 58 is pressed into hole 51d. Other materials including square tubing, rectangular tubing, round pipe, or any other shape that will telescope one into the other and be rigid enough to support mirror assembly 60 will suffice for the support elements.

A reducing fitting 52c is a pipe cap and is positioned over the upper end of support 51e and contains a fitting hole 52a that differs from the preferred embodiment in that it does not contain alignment notch 52b. A solid telescoping element 57e differs from preferred element 57, which is a hollow tube. Telescoping element 57e will slide through hole 52a without binding. Solid telescoping element 57e is a solid round rod with a alignment groove 57b, end to end, the length of element 57e. Heavy wall tubing or pipe can be used in place of solid round rod. A pushbutton spring hole 54a disposed in the lower end of element 57e is sized to receive pushbutton spring 55 and pushbutton 56. Mirror bracket hitch pin hole 57c disposed at the upper end of element 57e, is for bracket hitch pin 67. Insert telescoping element 57e, including pushbutton 56, and spring 55, into support 51e until pushbutton 56 protrudes through countersunk hole 51a. Applying pressure on pushbutton 56 will compress spring 55 and allows element 57e to slide up the inside of the tubular outer support tube 51e.

Figure 15:
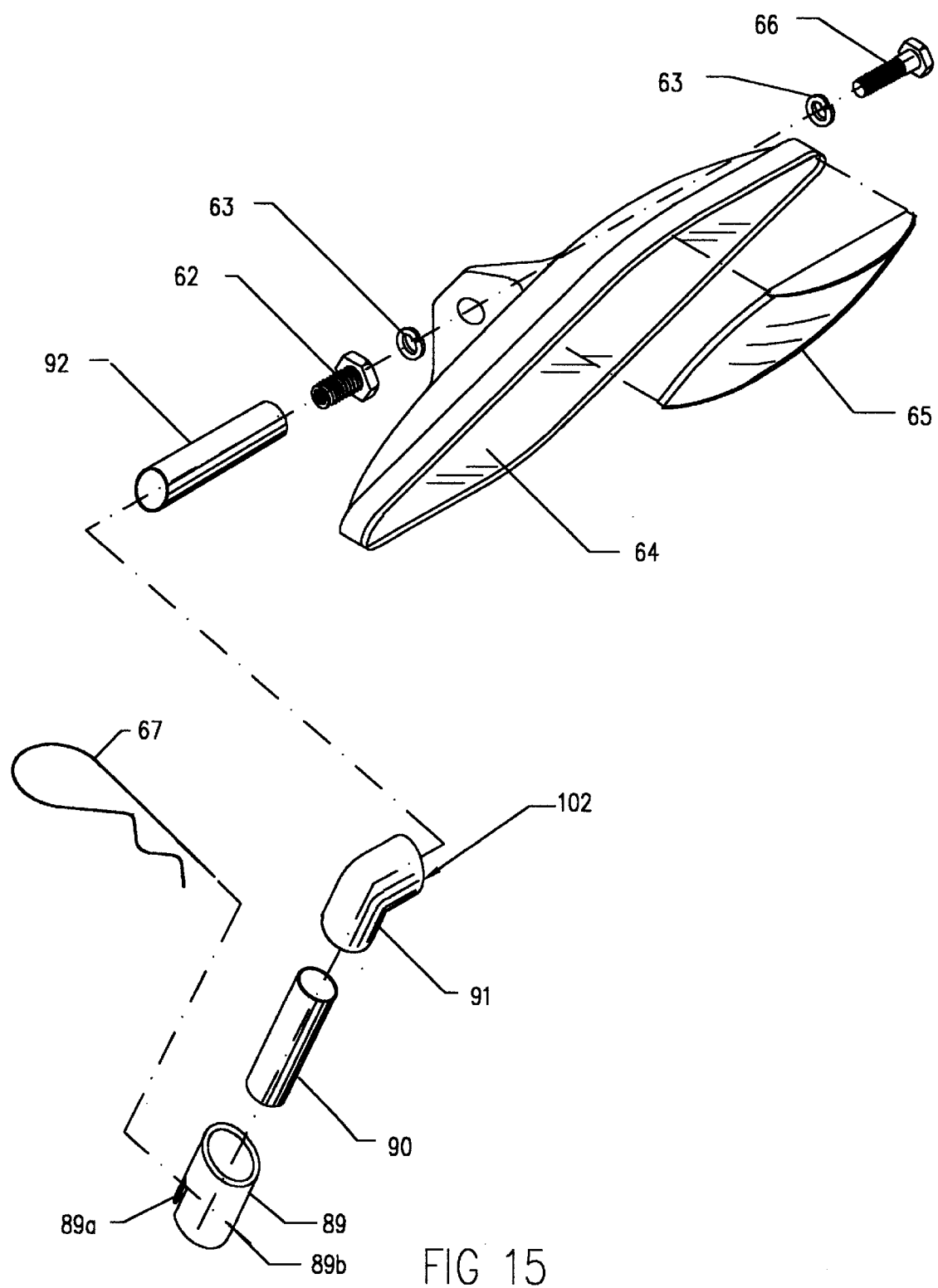
FIG. 15 shows an enlarged exploded isometric view of the first alternative embodiment mirror assembly.

FIG. 15—First Alternative Embodiment Of Mirror Assembly—Exploded Isometric View

An enlarged, exploded isometric view of first alternative mirror assembly 60 is shown in FIG. 15. In place of 90 degree bracket 61, a bracket coupling 89, sized to slip over the upper end of tube 57, a alignment slot 89a mates with alignment spline 57d, and a bracket hitch pin hole 89b. The upper end of coupling 89 is threaded if threaded pipe and fittings are used for the bracket construction, and is smooth if plain ended tube and fittings are used. A vertical bracket tube 90 has an outside diameter equal to the outside diameter of telescoping element 57, and is secured in the upper end of coupling 89. The upper end of tube 90 is secured in the vertical portion of a 90 degree elbow 91.

The proximal end of a horizontal bracket tube 92 is secured in the horizontal portion of elbow 91. Tube 92 is the same diameter as tube 90, and is long enough to allow elbow 91 to clear the edge of mirror 64. The distal end of tube 92 is threaded to receive bushing 62. After bushing 62 is threaded into the distal end of tube 92 mirror mounting bolt 66 is inserted through lock washer 63, then through the hole in the mounting bracket, protruding from the rear of flat mirror 64, through second lock washer 63 and into threaded bushing 62. This arrangement holds mirror 64, without slipping, and the alignment is changed by simply loosening bolt 66, adjusting rotating mirror 64, and retightening bolt 66.

Operation Of Alternative Embodiments—FIGS. 13, 14, and 15

The manner of using the alternative embodiments shown in FIGS. 13, 14, and 15 are the same as the manner of using the preferred embodiments. The alternative embodiments are structural difference in the alignment system and the 90-degree bracket assembly and do not affect the operation of the apparatus.

Figure 16:
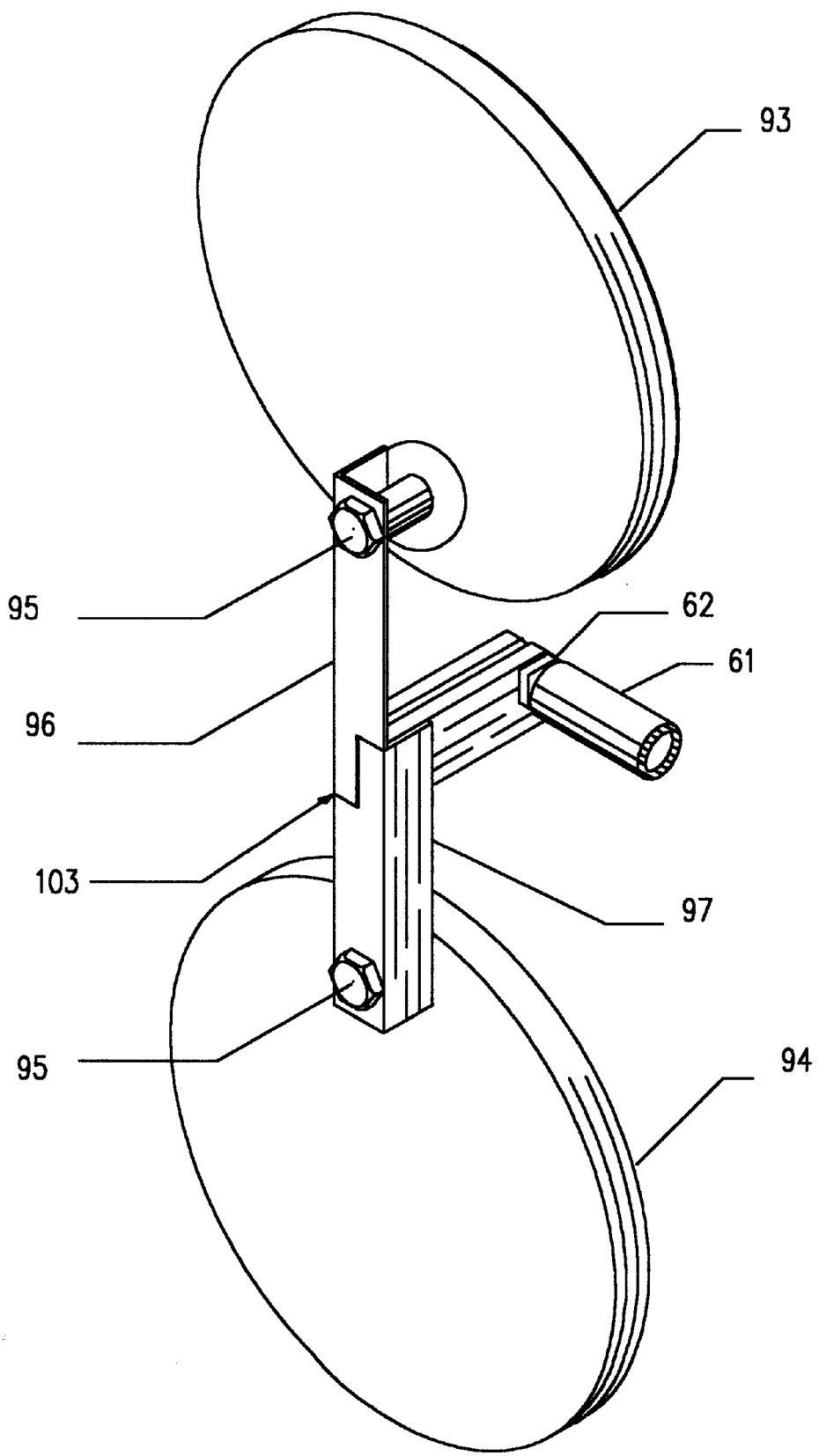
FIG. 16 shows an isometric view of the second alternative mirror assembly using a round convex mirror and a round flat mirror, of the same diameter, mounted on a pivoting set of brackets.

FIG. 16—Second Alternative Embodiment Of Mirror Assembly—Isometric View

A second alternative embodiment of mirror assembly is shown in a rear isometric view that differs from the preferred embodiment of the mirror assembly and the first alternative embodiment of the mirror assembly. In place of convex mirror 65 being attached to flat mirror 64, a round convex mirror unit 93 containing an integral mounting post attaches to a round convex mirror bracket 96 using a mirror attachment bolt 95. A round flat mirror unit 94 containing an integral mounting post attaches to a round flat mirror bracket 97 using mirror attachment bolt 95. The two mirror brackets attach to bushing 62 that is threaded into 90 degree bracket 61. Square, rectangular, or any shape mirrors may be used in place of the round mirrors shown, as long as they are of equal size and shape.

Figure 17:
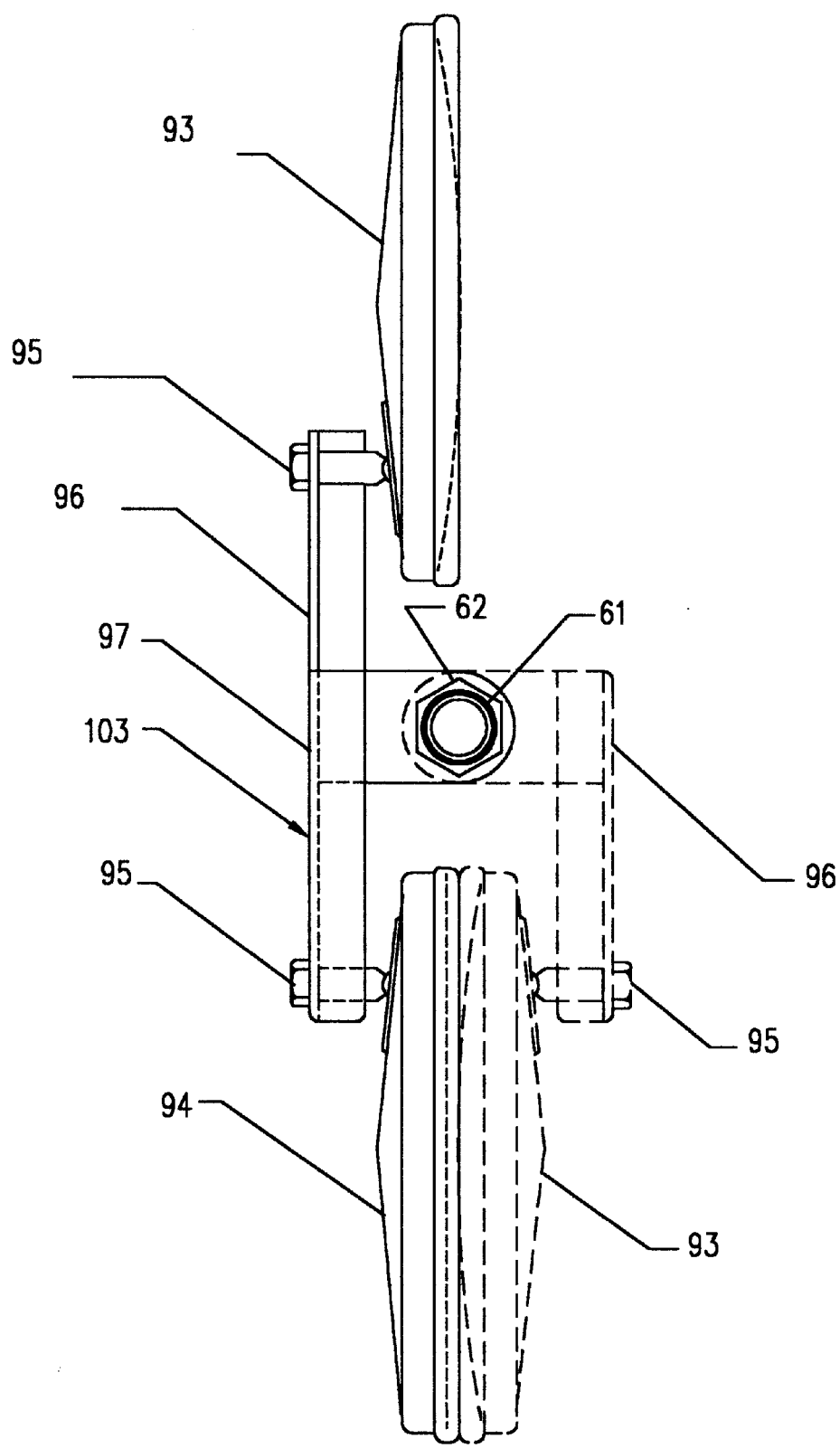
FIG. 17 shows a side view of the second alternative mirror assembly in the open position, for use and in the closed position, shown in dashed lines, for storage.

FIG. 17—Second Alternative Embodiment Of Mirror Assembly—Side View

The solid line drawings of FIG. 17 show a side view of the second alternative mirror assembly in the open position for use. The dashed line drawing shows convex mirror 93, mirror attachment bolt 95, and round convex mirror bracket 96, rotated 180 degrees to cover round flat mirror 97 for storage.

Figure 18:
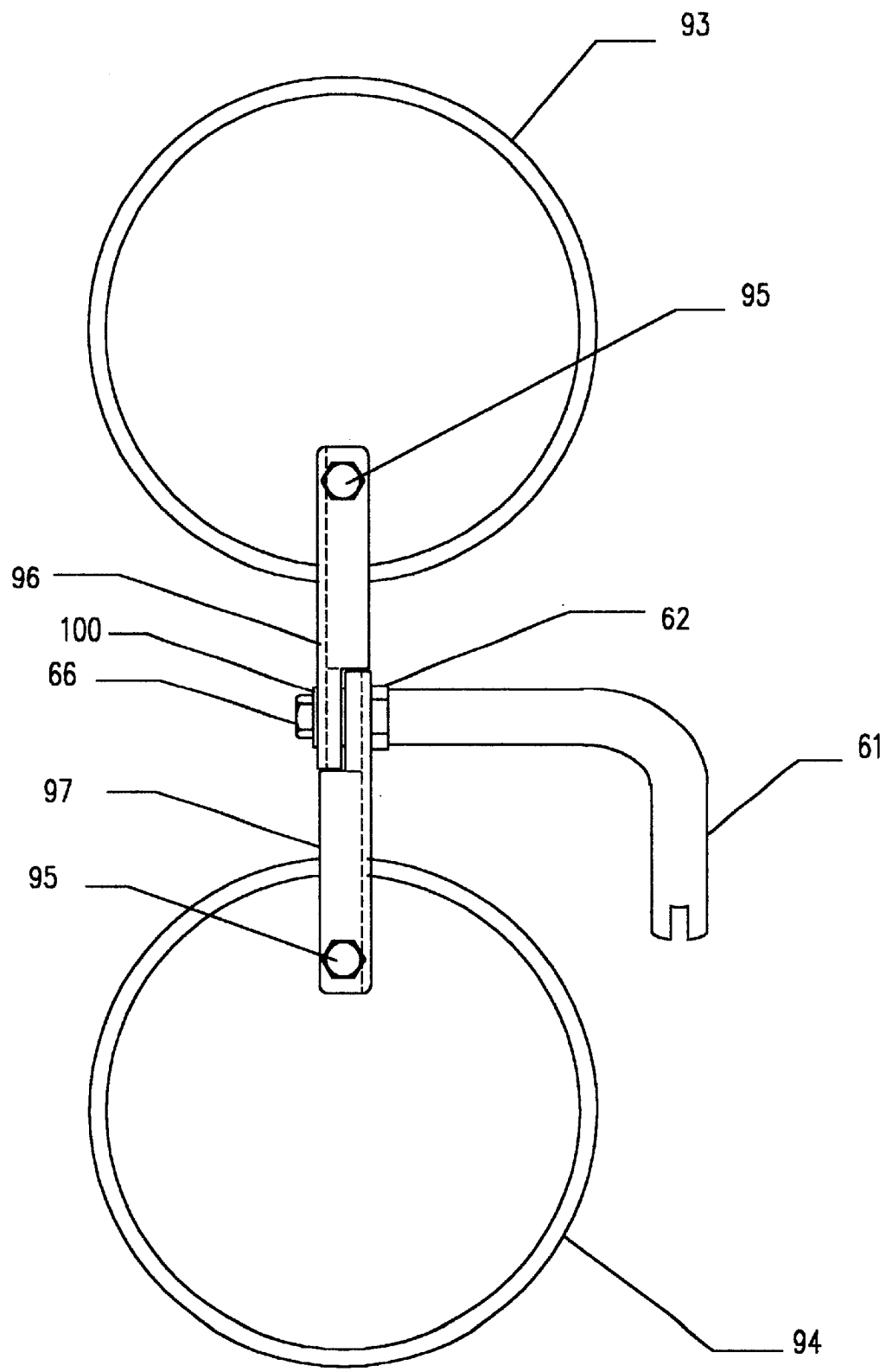
FIG. 18 shows a rear view of the second alternative mirror assembly.

FIG. 18—Second Alternative Embodiment of Mirror Assembly—Rear View

The rear view of the second alternative mirror assembly of FIG. 18 shows round convex mirror bracket 96 is attached to round convex mirror 93 using mirror attachment bolt 95. Round flat mirror bracket 97 is attached to round flat mirror 94 using mirror attachment bolt 95. The mirror brackets 96, and 97 are connected to 90 degree bracket 61 using mirror mounting bolt 66, through a washer 100, and is threaded into bushing 62 that has been threaded into 90 degree bracket 61. Bracket 61 slips over the end of telescoping tube 57 as shown in FIG. 8.

Figure 19:
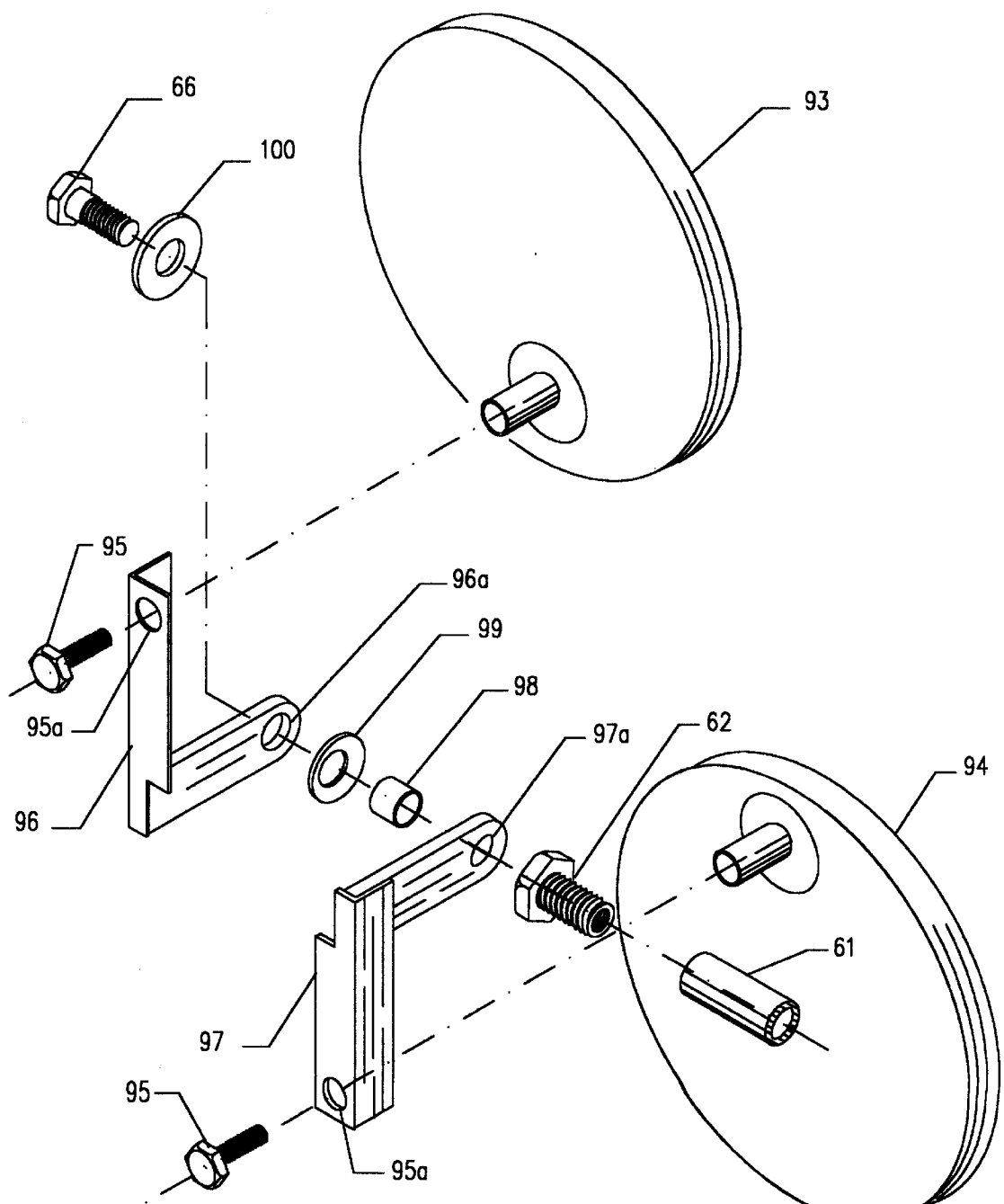
FIG. 19 shows an exploded isometric view of the second alternative mirror assembly.

FIG. 19—Second Alternative Embodiment of Mirror Assembly—Exploded Isometric View An exploded isometric view of FIG. 19 details the parts and assembly of the second alternative embodiment of the mirror assembly. Round convex mirror bracket 96 is fabricated of metal or plastic in an "L" shape an is attached to round convex mirror 93 using mirror attachment bolt 95. A round mirror attachment bolt hole 95a in the upper end of the vertical leg of bracket 96, is slightly larger diameter than bolt 95. A convex mirror bracket sleeve hole 96a is positioned in the distal end of the horizontal leg of bracket 96. The diameter of hole 96a is slightly larger than the outside diameter of a mirror mounting bolt sleeve 98. Round flat mirror bracket 97 is identical to bracket 96 except the hole in the distal end of the horizontal leg is a flat mirror bracket mounting bolt hole 97a and is the same diameter as the inside diameter of sleeve 98 which is slightly larger than the diameter of mirror mounting bolt 66. Bracket 97 is attached to round flat mirror 94 using mirror attachment bolt 95 through hole 95a. A spring washer 99 is slipped over sleeve 98. Sleeve 98 is long enough to allow bolt 66 and washer 100 to tighten against one end of sleeve 98 while the other end of sleeve 98 bears against the side of the horizontal leg of bracket 97. Tightening bolt 66, compresses spring washer 99 sufficiently to provide enough friction to hold bracket 96 and 97 in any desired position. Sleeve 98 allows bracket 96 and mirror 93 to rotate 180 degrees to cover mirror 94. Mirror brackets 96, and 97 are connected to 90 degree bracket 61 using mirror mounting bolt 66. Bolt 66 passes through washer 100, through sleeve 98, through hole 97a and is threaded into bushing 62 that has been threaded into 90 degree bracket 61. The lower end of 90 degree bracket 61 slips over the upper end of telescoping tube 57 and hitch pin 67 is inserted through mirror bracket hitch pin hole 57c, as shown in FIG. 8. The round mirrors are approximately 8" in diameter.

Operation of Second Alternative Embodiments—FIGS. 16, 17, 18, and 19

The manner of using the alternative embodiments shown in FIGS. 16 through 19 vary from the preferred embodiments shown in FIGS. 1 through 8. Mirror assembly 60 utilizes convex mirror 65 attached to flat rectangular mirror 64 bolted to bracket 61 for use and storage. The second alternative embodiment of the mirror assembly using the two round mirrors allows both mirrors to be viewed in the open position. Convex mirror 93 is rotated from the open viewing position, 180 degrees, to fold down over flat mirror 94 for safe storage. Spring washer 99 provides sufficient friction to hold convex mirror 93 in position. To reuse the apparatus, rotate convex mirror 93 open until the ends of the vertical legs of mirror brackets 96 and 97 contact each other. Mirrors 93 and 94 will then be in alignment for use.

Advantages

From the above, a number of advantages of my viewing apparatuses for visual alignment during trailer hitch-up become evident.

(a) The use of flat mirror 64 and convex mirror 65 allow the vehicle driver to get a large field of vision in convex mirror 65 to locate the trailer hitch while backing up to the trailer, and flat mirror 64 gives a larger view of the two hitches allowing the driver to make the final alignment.

(b) The use of flat mirror 64 and convex mirror 65, attached together to form one unit, and mounted so that they can rotate in the horizontal plane, as well as the vertical plane, allows the mirrors to be adjusted for use on any type of trailer that has a single tongue or an A-frame tongue.

(c) Telescoping support 50 allows the mirrors to be raised or lowered to fit the sight line of the towing vehicle's rearview mirror, without the use of tools. This feature makes this apparatus adaptable to any vehicle from a small automobile to a large pickup truck or utility vehicle.

(d) Countersunk holes 51c at the top, and 51a at the bottom of outer support tube 51 lock the pushbutton into the fully down or fully up position. These are the most used position for automobiles and standard pickup trucks. Additional countersunk holes can be drilled in outer support tube 51 for locking in intermediate heights. The friction imparted by spring mounted pushbutton 56 against the inner face of outer support tube 51 is enough to hold telescoping tube 57 at any height between the fully down and fully extended positions.

(e) Alignment spline 57d on telescoping tube 57, and the alignment notch 52b in fitting 52 maintain the mirrors alignment at all heights (f) Base assembly 30 will fit a number of different size and configurations of trailer tongues. Hole 46b and slot 46a in base plate 46 make it adaptable to tongue sizes of different widths and the depth of the tongue can be accommodated by the use of the proper size U-bolt. A rounded bottom U-bolt instead of a square bottom U-bolt is used on trailers with pipe tongues and a longer base plate can be used if necessary. This advantage makes this mirror apparatus usable on practically all trailers with tongues.

(g) Rotating support 32 can be rotated with or without telescoping support assembly 50 installed. The advantage is when returned to its previous setting against the preset stop 34, after each rotation for storage, it will remain at the proper angle. With telescoping support assembly 50 and mirror assembly 60 installed, the desired mirror alignment will remain.

(h) One of the biggest advantages of base assembly 30 is that cam lock handle 36 can be tightened to hold all of the elements in place or a small movement of cam lock handle 36 allows telescoping support assembly 50 and mirror assembly 60 to be rotated from the viewing position to the storage position without disturbing adjustable stop 34.

(i) Loosening cam lock handle 36 to the full open position allows compression spring 33, between the striated face of base bracket 35 and the striated face of adjustable stop 34, to disengage allowing adjustable stop 34 to be reset to a new position. The angle of telescoping support assembly 50 can then be changed to meet the requirements of the mounting position on the trailer tongue or a change in the type of towing vehicle. The next time the apparatus is uses rotating support 50 will be rotated to the pre set stop, and the apparatus will be in alignment, ready for use.

(j) After the trailer hitch-up is complete, telescoping support assembly 50 and mirror assembly 60 can be rotated to the horizontal position and stored in storage clip 75, out of harms way. This gives the mirror apparatus the advantage of being readily available for the next hitch-up and the advantage of being stored offset of the trailer tongue, allowing a person to use the trailer tongue as a walkway, when launching or retrieving a boat, to avoid having to get into the water.

(k) Mirror assembly 60 can be removed after removal of hitch pin 67 for separate storage. When it is reinstalled with alignment spline 57d positioned in alignment slot 61a, and hitch pin 67 inserted, the mirrors will be in proper alignment. No tools are required.

(l) Telescoping support assembly 50 is removed by removal of coupling hitch pin 38 and slipping outer support 51 out of coupling 39 for separate storage, with or without mirror assembly 60. No tools are required.

(m) The second alternative embodiment of the mirror assembly allows the mirrors to be stored face to face which protects the mirror faces and still allows mirror 93 to be rotated to the upper position for viewing while maintaining proper alignment. Mirror 94 will remain in the preset alignment by bolt 66 and washer 100 pressing against sleeve 98 that bears against the horizontal leg of bracket 97 clamping bracket 97 against bushing 62.

Conclusion, Ramifications, and Scope

Accordingly, the reader will see that this is superior to any known hitch viewer. The fact that it does not have to be readjusted each time it is used is very important to the user. Furthermore, the viewer has additional advantages in that it provides:

a flat mirror and convex mirror combination that allow the vehicle driver a large field of vision from the convex mirror and a large reflection of the hitches from the flat mirror for final alignment;

a means of adjusting the height of the mirrors while keeping the mirrors aligned;

a positive lock at various heights using the countersunk holes and pushbutton;

an adjustable stop so that the support assembly will return to the same position for each use;

a means of rotating the telescoping support and mirrors, without disturbing the preset stop;

an out-of-the-way storage for the apparatus, when not in use, offset to the side of the trailer tongue;

an offset mirror mounting to provide the centering of the mirrors over the trailer hitch;

easy removal of the mirror assembly and the telescoping support assembly, for secure storage to prevent theft;

Although the description above contains many specificities, these should not be construed as limiting the scope of the invention but as merely providing illustrations of some of the presently preferred embodiments of this invention. For example the telescoping tube can be made of pipe, tubing, or solid bar. The support assembly can be made of square, rectangular or other shapes. The mirrors can be made in one piece with the convex portion and the flat portion integral, such the one-piece mirror can be considered a "pair". Separate convex and flat mirrors can be mounted on separate, adjustable brackets. The convex mirror bracket rotates around the flat mirror bracket allowing the mirrors to fold together, face to face, so that the mirror faces are protected by each other during storage, and the brackets are attached to the mirror assembly in place of the combined mirrors shown. The outer support can have more countersunk holes for, easy height adjustment, for specific vehicles. The hitch viewing mirror apparatus can be constructed of plastic, nylon, fiberglass, carbon fiber, aluminum, stainless steel, brass, galvanized steel, or any combination of materials that resist corrosion and weathering.

Thus the scope of the invention should be determined by the appended claims and their legal equivalents, rather than by the example given.

I claim:

1. A trailer hitch viewing mirror apparatus, comprising;
   (a) a convex mirror,
   (b) a flat mirror,
   (c) a rotating mount assembly for holding said convex and flat mirrors,
   (d) a telescoping support assembly for supporting said mount in a range of positions on a trailer tongue, such that said mirrors can be seen by a driver of a motor vehicle having a trailer hitch, via a rear-view mirror of said vehicle and such that said mirrors will provide said driver with a view of a trailer receiving hitch, and a vehicle ball hitch via said rear-view mirror and said convex and flat mirrors,
   (e) a base assembly that can rotate on horizontal, and vertical axes, said base assembly being mountable on said trailer tongue,
   (f) an adjustable stop that will not slip when pressure is applied thereagainst,
   (g) said base assembly being positioned to hold said telescoping support assembly in a predetermined position against said adjustable stop, while allowing said support assembly to be rotated down for storage, and rotated up against said adjustable stop for use without realignment, and
   (h) a storage clip assembly mounted on said trailer tongue for storage of said telescoping support assembly and said mirrors.

2. The apparatus of claim 1 wherein said storage clip assembly comprises a storage plate, a means for securing said storage plate to said trailer tongue, a spring clip bolted to said storage plate, for retaining said telescoping support assembly for storage, offset to the side of said trailer tongue, to permit using said tongue as a walkway on boat trailers, and for enabling rotation of said support assembly for storage without interfering with winch supports, and butane bottles mounted mounted on said trailer tongue.

3. The apparatus of claim 1 wherein said base assembly comprises a base plate, a means of attaching said base plate to said trailer tongue, a rotating support with a bolt hole in the center and a radial, threaded projection, and further including a coupling threaded onto said threaded projection whose upper half receives said telescoping support assembly and contains alignment holes for a coupling hitch pin.

4. The apparatus of claim 3 wherein said base assembly comprises the adjustable stop having an adjustable stop body, a bolt hole through its center, and a smooth proximal end face, a striated distal end face, recessed to accommodate a coil compression spring, said adjustable stop body having a cylindrical stop protruding radially from an outer surface.

5. The apparatus of claim 3 wherein said base assembly comprises a base bracket having a base bracket body with a integral boss on the side of said base bracket body, positioned 90 degrees to said base bracket body centerline, and having a bolt hole for attachment to said base plate, and further including on said base bracket body, a striated proximal end face, having a recessed area around a bolt hole through the center of said base bracket body, and arranged to mate with a striated distal end face of said adjustable stop, and having a distal end face with two integral sloping cams, and further including a cam lock handle having a cam lock handle body, a bolt hole through its center, a handle projecting radial from the surface of said cam lock handle body, and a groove and two ridges in a proximal end face of said cam lock handle body, said groove and two ridges are arranged to mate with said distal end face with two integral sloping cams of said base bracket body, and further including a base pivot bolt having a head on one end and a threaded opposite end, inserted through the bolt holes, first through said rotating support, then through said adjustable stop, and then through said base bracket body, and then through said cam lock handle body, and further including a base pivot bolt locknut threaded on the threaded end of said base pivot bolt and is tightened to allow rotation of said rotating support when said cam lock handle is rotated slightly from its locked position, but will not allow a coil compression spring to separate the two striated faces of said adjustable stop and said base bracket body, rotating said cam lock handle approximately 90 degrees will allow said coil compression spring to disengage said adjustable stop and said base bracket to allow setting said adjustable stop to a new position, and can be re-locked by rotating said cam lock handle to its original position.

6. The apparatus of claim 1 wherein said telescoping support assembly comprises an outer support tube with countersunk holes disposed near the bottom and near the top of said tube, and a means for holding a telescoping tube in alignment, said telescoping tube containing a pushbutton, and a pushbutton spring that locks said telescoping tube in said countersunk holes of said support tube, said telescoping tube having a means of maintaining the alignment of said telescoping tube during up and down movement within the inside of said outer support tube.

7. The apparatus of claim 1 wherein said convex mirror is mounted upon said flat mirror using double-sided sticky tape, and further including a 90 degree bracket having horizontal and vertical tube sections, the horizontal tube section being connected to a mirror combination, comprising said convex mirror and said flat mirror, to the distal end of the horizontal tube section of said 90 degree bracket, a mirror mounting bolt passing through a lock washer, a mirror mounting bracket, integral with the back of said flat mirror, through another lock washer, and into a threaded bushing, having male threads on the outside, and female threads on the inside, said bushing being threaded into the distal end of the horizontal tube section of said 90 degree bracket, and threaded into the female threads of said bushing, so as to allow said mirror combination to rotate for alignment, and to be secured by tightening said mirror mounting bolt, the lower end of the vertical tube section of said 90 degree bracket having a means for alignment, and a bracket hitch pin hole, and mounts on said telescoping support assembly and being secured by a hitch pin.

8. A trailer hitch viewing mirror apparatus, comprising;
(a) a mirror assembly comprising a flat mirror and a convex mirror,
(b) an adjustable mounting assembly for holding said mirror assembly,
(c) an adjustable telescoping support assembly for supporting said adjustable mounting assembly in a range of positions on a tongue of a trailer, such that said mirrors can be seen by a driver of a motor vehicle having a trailer hitch, via a rear-view mirror of said vehicle such that said mirrors will provide said driver with a view of a trailer receiving hitch, and a vehicle ball hitch via said rear-view mirror and said convex and flat mirrors,
(d) an adjustable base assembly that can be rotated horizontally and vertically, said adjustable base assembly being mountable on said trailer tongue,
(e) an adjustable positive lock stop that will not slip when pressure is applied thereagainst,
(f) said adjustable base assembly being positioned to hold said adjustable telescoping support assembly in a predetermined position against said adjustable positive lock stop,
(g) said adjustable telescoping support assembly can be rotated down for storage, and rotated up against said adjustable positive lock stop for use without realignment, and
(h) a storage clip assembly mounted on said trailer tongue for storage of said telescoping support assembly said mirror assembly.

9. The apparatus of claim 8 wherein said storage clip assembly comprises a storage plate, a means for securing said storage plate to said trailer tongue, a spring clip bolted to said storage plate, for retaining said telescoping support assembly for storage.

10. The apparatus of claim 8 wherein said adjustable base assembly comprises a base plate, a means for securing said base plate to said tongue of a trailer, a rotating support with a bolt hole, and a radial projection with threads, a coupling threaded onto said radial projection containing alignment holes for a coupling hitch pin and said adjustable base assembly further comprising a adjustable positive lock stop, having a adjustable positive lock stop body with a bolt hole through its center, and a smooth proximal end face, a striated distal end face, a recessed area around said bolt hole, said adjustable positive lock stop body having a cylindrical stop protruding radial from its outer surface, and further including a coil compression spring, a adjustable base bracket having a adjustable base bracket body with an integral boss, bolted to said base plate, said adjustable base bracket body having a bolt hole and a recessed area around it, in its center, a proximal striated face interlocking with said distal striated face of said adjustable positive lock stop body, and a distal cam face, and a cam lock handle having a cam lock handle body with a proximal grooved and ridged face that mates with said adjustable positive lock stop body distal cam face, a flat handle protrudes radial from said cam lock handle body, and further including a base pivot bolt having a head on one end and a threaded opposite end, passing through bolt holes in the center of, first, said rotating support, then through said adjustable positive lock stop body, then through said coil compression spring, then through said base bracket body, and then through said cam lock handle body, and further including a base pivot bolt locknut threaded on said base pivot bolt and tightened to allow said rotating support, to rotate to and from its storage position, when said cam lock handle is rotated slightly from its locked position, but will allow said coil compression spring to separate the striated face of said adjustable positive lock stop body, and the striated face of said base bracket body, rotating said cam lock handle approximately 90 degrees will allow said coil compression spring to disengage the striated faces permitting rotating said adjustable positive lock stop to a new position, and said base assembly can be re-locked by rotating said cam lock handle to its locked position.

11. The apparatus of claim 8 wherein said adjustable telescoping support assembly comprises an outer support tube with countersunk holes, a telescoping tube, said telescoping tube further comprising a pushbutton, and a pushbutton spring that locks said telescoping tube in said countersunk holes of said support tube, said telescoping tube having a means of maintaining alignment.

12. The apparatus of claim 8 wherein said convex mirror is mounted upon said flat mirror, and further including a 90 degree bracket having horizontal and vertical tube sections, the horizontal tube section being bolted, using a mirror mounting bolt, to a mounting bracket integral with the back of said flat mirror, and into a threaded bushing, having threads on the outside, and mating threads on the inside, said bushing being threaded into the distal end of the horizontal tube section of said 90 degree bracket, so as to allow said mirror assembly to rotate for alignment, and to be secured by tightening said mirror mounting bolt, the lower end of the vertical tube section of said 90 degree bracket having a means for alignment, and a bracket hitch pin hole, and mounts on said telescoping support assembly and being secured by a hitch pin.

13. The apparatus of claim 8 wherein said convex mirror is mounted upon said flat mirror, and further including a 90 degree bracket having horizontal and vertical tube sections, the horizontal tube section being connected to said flat mirror with a mirror mounting bolt through a rear bracket of said flat mirror, and into a threaded bushing, having threads on the outside, and mating threads on the inside, said bushing being threaded into the distal end of the horizontal tube section of said 90 degree bracket, so as to allow said mirror assembly to rotate for alignment, and to be secured by tightening said mirror mounting bolt, the lower end of the vertical tube section of said 90 degree bracket having a alignment slot, and a bracket hitch pin hole, and mounts on said adjustable telescoping support assembly, and being secured by a hitch pin.

14. A device for enabling a driver in the drivers seat of a towing vehicle having a vehicle ball hitch which is mounted on the rear of said towing vehicle to easily align said vehicle ball hitch with a mating trailer receiving hitch which is mounted on a trailer tongue of a vehicle to be towed, comprising;
(a) a pair of mirrors, one of which is convex, the other of which is flat, and
(b) a bracket for mounting said pair of mirrors on said towed vehicle in a position where said driver can view side pair of mirrors from the driver's seat, and
(c) an adjustable telescoping support assembly for supporting said bracket that will remain in alignment even after being used and being stored and reused, and
(d) an adjustable base assembly that allows the said telescoping support assembly to rotate horizontally for storage and approximately vertically for use, and
(e) a storage clip assembly attached to said trailer tongue for storage of said telescoping support assembly and said pair of mirrors.

15. The device of claim 14 further including two L-shaped brackets that essentially are identical in size and shape, and where each mirror is mounted on one of said L-shaped brackets, using a mirror bracket bolt through a washer, a bracket bolt sleeve which passes through L-shaped bracket attached to said convex mirror, and bears against said L-shaped bracket attached to said flat mirror allowing said convex mirror to rotate to an open position for use, or to a closed position with said convex mirror and said flat mirror being face to face, thereby protecting the face of said pair of mirrors from damage during storage, and further having a spring washer positioned between said L-shaped, and around said sleeve to provide sufficient friction to hold said mirrors in position.

16. The device of claim 14 wherein said telescoping support assembly comprises an outer support tube with countersunk holes disposed near the bottom and near the top of said tube, and a means for holding a telescoping tube in alignment, said telescoping tube containing a pushbutton, and a pushbutton spring that locks said telescoping tube in said countersunk holes of said support tube, said telescoping tube having a means of maintaining the alignment of said telescoping tube during up and down movement within the inside of said outer support tube.

17. The device of claim 14 wherein said base assembly comprises a base plate, a means of attaching said base plate to said trailer tongue, a rotating support with a bolt hole in the center and a radial, threaded projection, and further including a coupling threaded onto said threaded projection whose upper half receives said adjustable telescoping support assembly and contains alignment holes for a coupling hitch pin.

18. The device of claim 17 wherein said adjustable base assembly comprises a adjustable stop having a adjustable stop body, a bolt hole through its center, and a smooth proximal end face, a striated distal end face with a recessed center area, said adjustable stop body having a cylindrical stop protruding radially from an outer surface.

19. The device of claim 17 wherein said base assembly comprises a base bracket having a base bracket body with a integral boss on the side of said base bracket body, positioned 90 degrees to said base bracket body centerline, and having a bolt hole for attachment to said base plate, and further including on said base bracket body, a striated proximal end face, having a recessed area around a bolt hole through the center of said base bracket body, and arranged to mate with a striated distal end face of an adjustable stop, and having a distal end face with two integral sloping cams, and further including a cam lock handle having a cam lock handle body, a bolt hole through its center, a handle projecting radial from the surface of said cam lock handle body, and a groove and two ridges in a proximal end face of said cam lock handle body, said groove and two ridges are arranged to mate with said distal end face with two integral sloping cams of said base bracket body, and further including a base pivot bolt having a head on one end and a threaded opposite end, inserted through the bolt holes, first through said rotating support, then through said adjustable stop, and then through said base bracket body, and then through said cam lock handle body, and further including a base pivot bolt locknut threaded on the threaded end of said base pivot bolt and is tightened to allow rotation of said rotating support when said cam lock handle is rotated slightly from its locked position, but will not allow a coil compression spring to separate the two striated faces of said adjustable stop and said base bracket body, rotating said cam lock handle approximately 90 degrees will allow said coil compression spring to disengage said adjustable stop and said base bracket to allow setting said adjustable stop to a new position, and can be re-locked by rotating said cam lock handle to its original position.

20. The device of claim 14 wherein said storage clip assembly comprises a storage plate, a means for securing said storage plate to said trailer tongue, a spring clip bolted to said storage plate, for retaining said telescoping support assembly for storage, offset to the side of said trailer tongue, to permit using said tongue as a walkway on boat trailers, and for enabling rotation of said support assembly for storage without interfering with winch supports, braces, and butane bottles mounted on said trailer tongue.

* * * * *